(12) United States Patent
Childers et al.

(10) Patent No.: US 11,016,251 B2
(45) Date of Patent: May 25, 2021

(54) MINI DUPLEX CONNECTOR WITH PUSH-PULL POLARITY MECHANISM AND CARRIER

(71) Applicant: US Conec, Ltd, Hickory, NC (US)

(72) Inventors: Darrell R. Childers, Hickory, NC (US); Jillcha F. Wakjira, Hickory, NC (US); Jason Higley, Hickory, NC (US); Michael E. Hughes, Hickory, NC (US); Mitchell Cloud, Matthews, NC (US)

(73) Assignee: US Conec, Ltd., Hickory, NC (US)

( * ) Notice: Subject to any disclaimer, the term of this patent is extended or adjusted under 35 U.S.C. 154(b) by 154 days.

(21) Appl. No.: 16/462,905

(22) PCT Filed: Dec. 19, 2018

(86) PCT No.: PCT/US2018/066523
§ 371 (c)(1),
(2) Date: May 21, 2019

(87) PCT Pub. No.: WO2019/126337
PCT Pub. Date: Jun. 27, 2019

(65) Prior Publication Data
US 2020/0285001 A1    Sep. 10, 2020

Related U.S. Application Data

(60) Provisional application No. 62/634,271, filed on Feb. 23, 2018, provisional application No. 62/607,555, filed on Dec. 19, 2017.

(51) Int. Cl.
*G02B 6/38* (2006.01)

(52) U.S. Cl.
CPC .......... *G02B 6/3898* (2013.01); *G02B 6/3812* (2013.01); *G02B 6/3825* (2013.01); *G02B 6/3857* (2013.01); *G02B 6/3893* (2013.01)

(58) Field of Classification Search
CPC .. G02B 6/3898; G02B 6/3812; G02B 6/3857; G02B 6/3825; G02B 6/3893; G02B 6/09
See application file for complete search history.

(56) References Cited

U.S. PATENT DOCUMENTS

| | | | |
|---|---|---|---|
| 5,619,604 | A | 4/1997 | Shiflett et al. |
| 5,737,463 | A | 4/1998 | Weiss et al. |
| 6,352,373 | B1 | 3/2002 | Yamaguchi |
| 10,191,230 | B2 | 1/2019 | Wong et al. |
| 10,527,802 | B2 | 1/2020 | Wong et al. |
| 10,585,247 | B2 * | 3/2020 | Takano ................ G02B 6/4292 |

(Continued)

OTHER PUBLICATIONS

International Search Report and Written Opinion for International Patent Application No. PCT/US2018/066523 dated Mar. 5, 2019, 6 pages.

*Primary Examiner* — Andrew Jordan
(74) *Attorney, Agent, or Firm* — Michael L. Leetzow, P.A.; Shubhrangshu Sengupta

(57) ABSTRACT

A new fiber optic connector provides a smaller form factor by including two ferrule assemblies in a housing. The housing accepts a push-pull mechanism that allows for insertion and removal from a carrier as well as an adapter. The push-pull mechanism may also include a flexure member to return the push-pull mechanism. Polarity of the fiber optic connector may also be selected by use of the push-pull mechanism.

16 Claims, 37 Drawing Sheets

(56) References Cited

U.S. PATENT DOCUMENTS

| | | | |
|---|---|---|---|
| 10,677,996 B2* | 6/2020 | Aoshima | G02B 6/3898 |
| 2010/0008635 A1* | 1/2010 | Zimmel | G02B 6/3825 |
| | | | 385/135 |
| 2010/0220961 A1 | 9/2010 | Jong et al. | |
| 2014/0133820 A1* | 5/2014 | Zimmel | G02B 6/4452 |
| | | | 385/135 |
| 2014/0169727 A1 | 6/2014 | Veatch et al. | |
| 2015/0030289 A1 | 1/2015 | Jiang et al. | |
| 2015/0177463 A1 | 6/2015 | Lee et al. | |
| 2016/0238796 A1 | 8/2016 | Nguyen et al. | |
| 2016/0306125 A1 | 10/2016 | Wu et al. | |
| 2016/0327757 A1 | 11/2016 | Lee | |
| 2017/0299818 A1 | 10/2017 | Chang et al. | |
| 2018/0252872 A1* | 9/2018 | Chen | G02B 6/3825 |
| 2019/0018201 A1 | 1/2019 | Takano et al. | |
| 2019/0278028 A1* | 9/2019 | Higley | G02B 6/3825 |
| 2020/0150357 A1* | 5/2020 | Higley | G02B 6/3825 |
| 2020/0284998 A1* | 9/2020 | Higley | G02B 6/3857 |
| 2020/0285001 A1* | 9/2020 | Childers | G02B 6/3898 |
| 2020/0301077 A1* | 9/2020 | Leigh | G02B 6/3831 |
| 2020/0371299 A1* | 11/2020 | Gniadek | H01R 13/6271 |

* cited by examiner

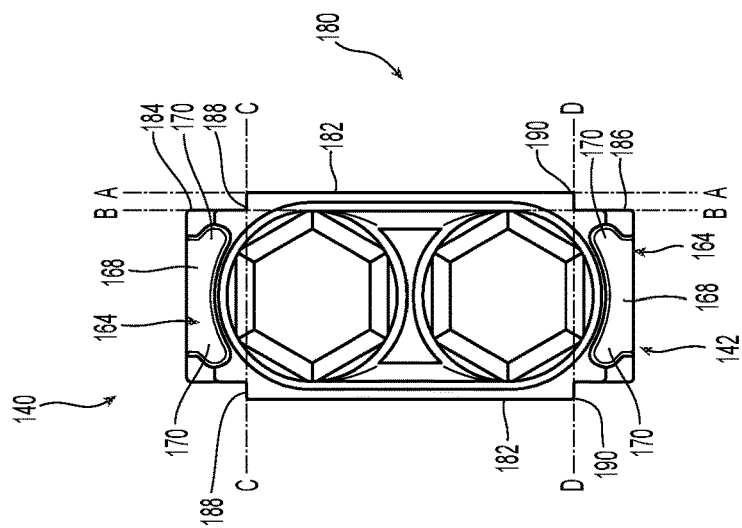
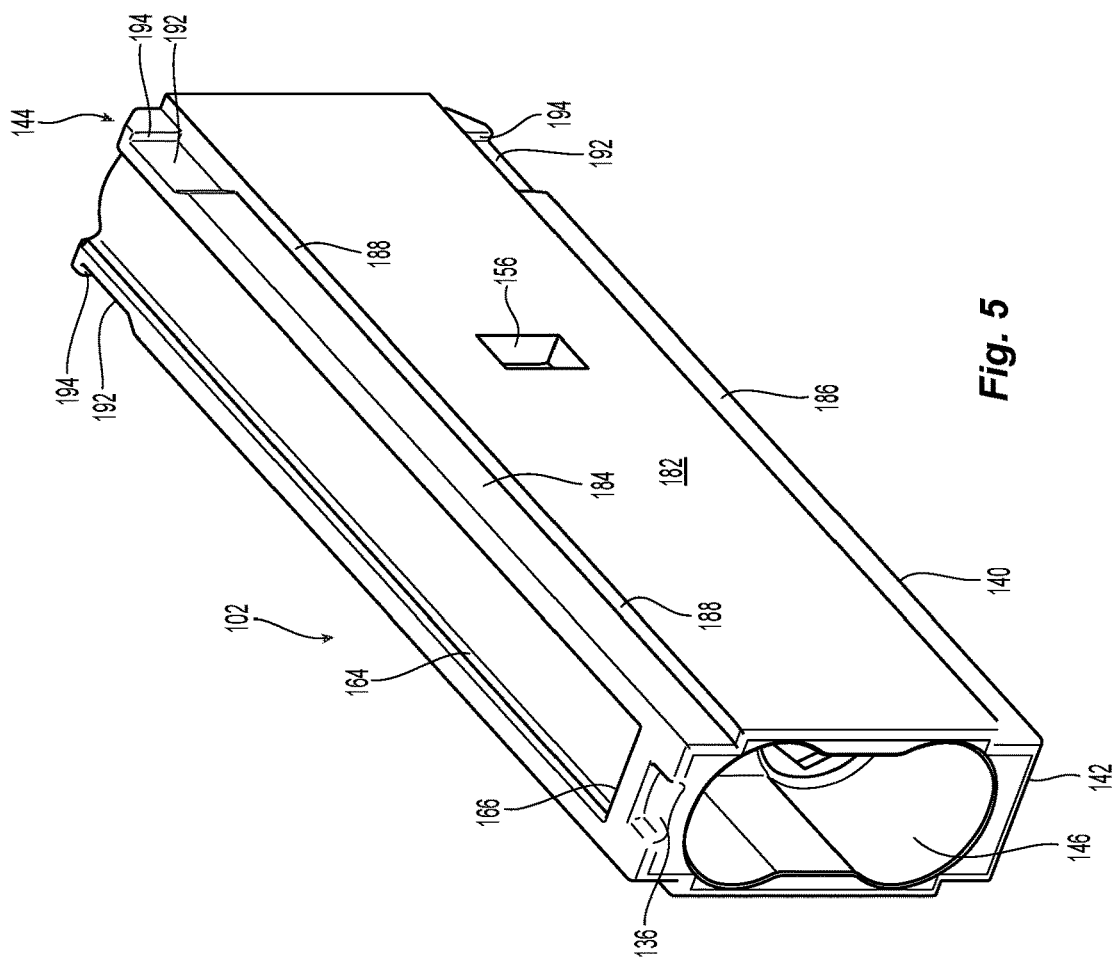
Fig. 6
Fig. 5

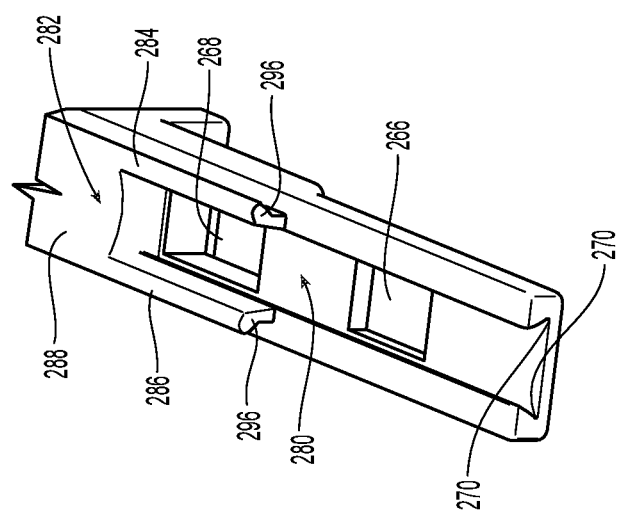
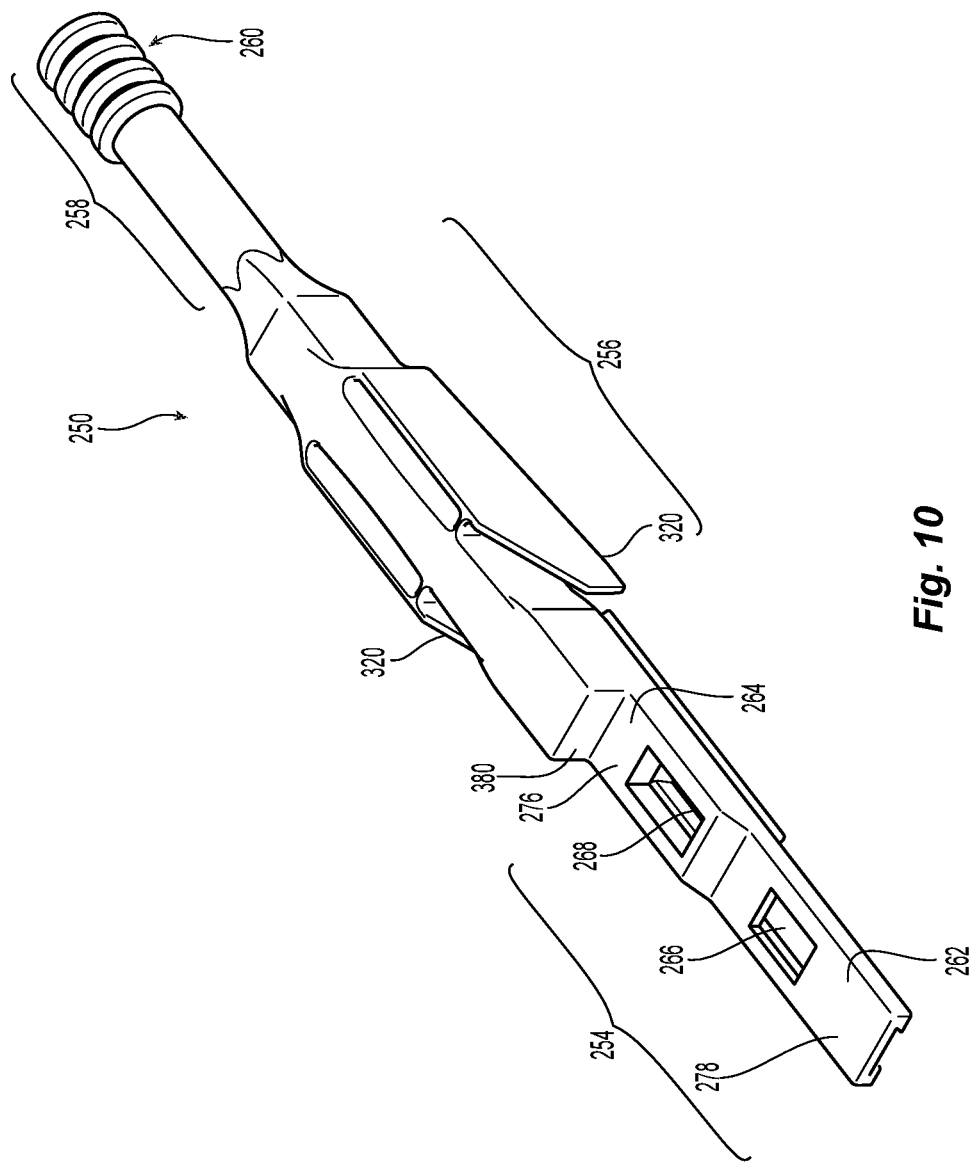
Fig. 10A
Fig. 10

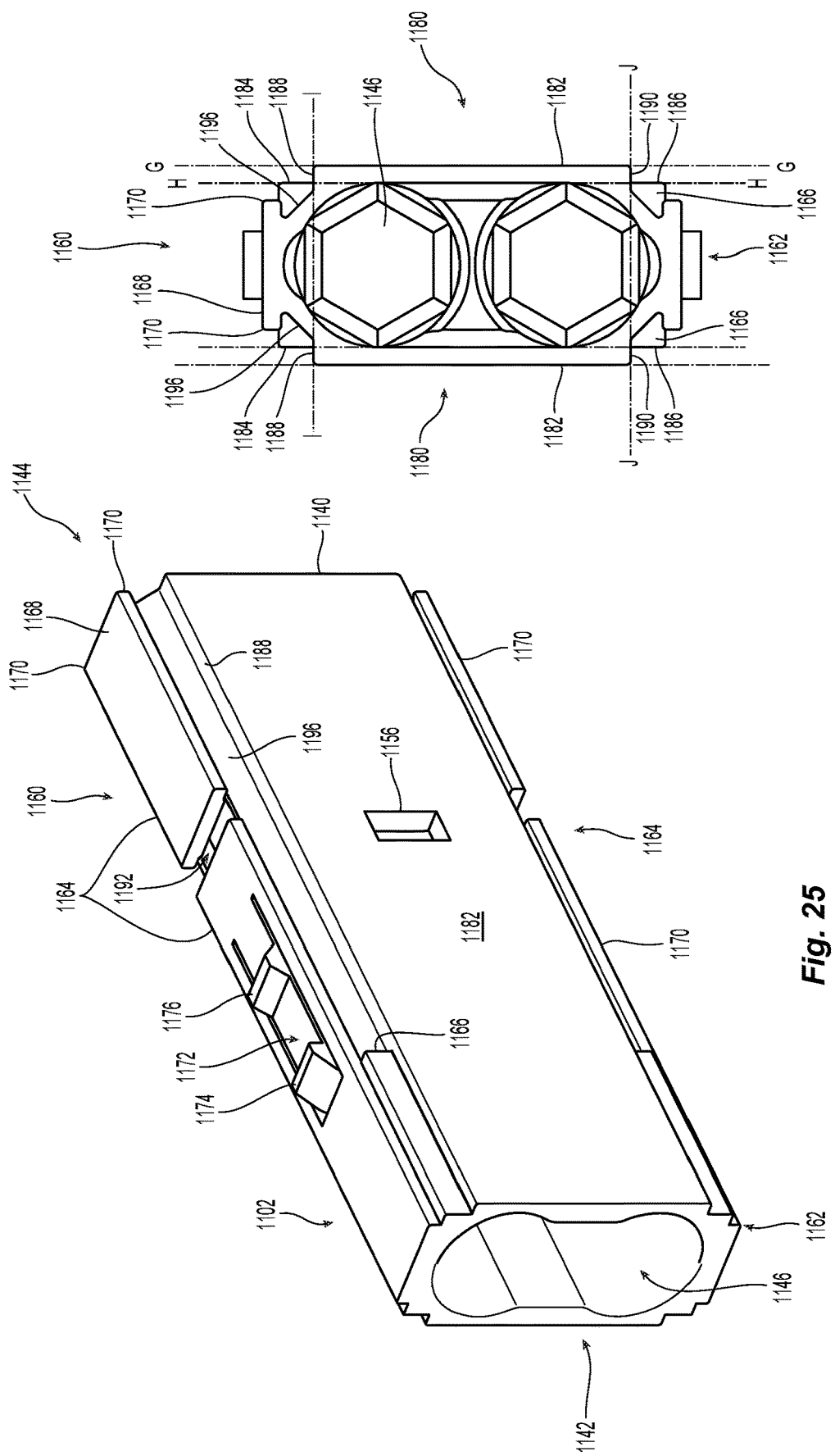

MINI DUPLEX CONNECTOR WITH PUSH-PULL POLARITY MECHANISM AND CARRIER

This application claims priority of U.S. Provisional Patent Application Ser. No. 62/607,555, filed on Dec. 19, 2017 and Provisional Patent Application Ser. No. 62/634,271, filed on Feb. 23, 2018, the contents of which are incorporated by reference.

BACKGROUND OF THE INVENTION

Field of the Invention

In the small form-factor pluggable (SFP and QSFP) industry, there are a number of different ferrules and designs that are used. In some applications, an MT ferrule is used, while in others it is the LC form that is used. The LC connector uses a single optical fiber and fiber optic ferrule per housing. In higher density applications, the LC connector may not be used because the space that each of the LC connectors use. Thus, it would beneficial to reduce the footprint of the LC connector by reducing the pitch between the fiber optic ferrules.

Applicant has a new design for a fiber optic connector using the LC fiber optic ferrule to reduce the overall footprint of the fiber optic connector. In addition, an insertion/removal tool has been included to allow for the reduced footprint, allowing a user to more easily insert and remove the new fiber optic connectors. The fiber optic connector and the insertion/removal tool may also provide a way to ensure the correct polarity of the fiber optic connector and to even change the polarity in the field.

Finally, the insertion/removal tool may include a way for it to be self-returning after a user inserts/removes the fiber optic connector.

SUMMARY OF THE INVENTION

The present invention is directed to a push-pull mechanism for use with a fiber optic connector having a housing with a top housing surface and a bottom housing surface that includes a main body having a front portion, a middle portion and a rear portion, a latch body connected to the front portion of the main body, the front portion having at least one window to receive at least one latch therethrough from the latch body, the at least one latch for engaging a fiber optic connector adapter, and a rail portion extending along side portions of the latch body and main body to slidably engage the fiber optic connector housing on one of the top housing surface and the bottom housing surface.

In some embodiments, the push-pull mechanism includes a flexure member connected to the latch body to bias the main body toward a front end of the fiber optic connector housing.

In some embodiments, the at least one window comprises two windows and the at least one latch comprises two latches, the second latch extending through the second window and to engage a carrier.

In some embodiments, wherein the location of the rail portion in the fiber optic connector housing thereby determines a polarity of the fiber optic connector.

In another aspect, the invention is directed to a push-pull mechanism for use with a fiber optic connector having a housing with a top housing surface and a bottom housing surface that includes a main body having a front portion, a middle portion and a rear portion, two latches extending outward from the front portion, the first latch for engaging a fiber optic connector adapter and the second latch for engaging a carrier, a rail portion extending along side portions of the main body to slidably engage the fiber optic connector housing on one of the top housing surface and a bottom housing surface, and a grasping portion on the rear portion to allow a user to push and pull the push-pull mechanism to engage and disengage the fiber optic connector from the carrier and the adapter.

In some embodiments, the push-pull mechanism further includes a flexure member connected to the latch body to bias the main body toward a front end of the fiber optic connector housing.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 5 is a perspective view of the housing of the fiber optic connector in FIG. 1 and FIG. 3;

FIG. 6 is a rear elevational view of the housing in FIG. 5;

FIG. 10 is a perspective view of the push-pull mechanism of FIG. 1;

FIG. 10A is a perspective view of the underside of the push-pull mechanism of FIG. 10;

FIG. 25 is a perspective view of the housing of the fiber optic connector in FIG. 23;

FIG. 26 is a rear elevational view of the housing in FIG. 25;

DETAILED DESCRIPTION OF THE PREFERRED EMBODIMENTS

Figure 1:
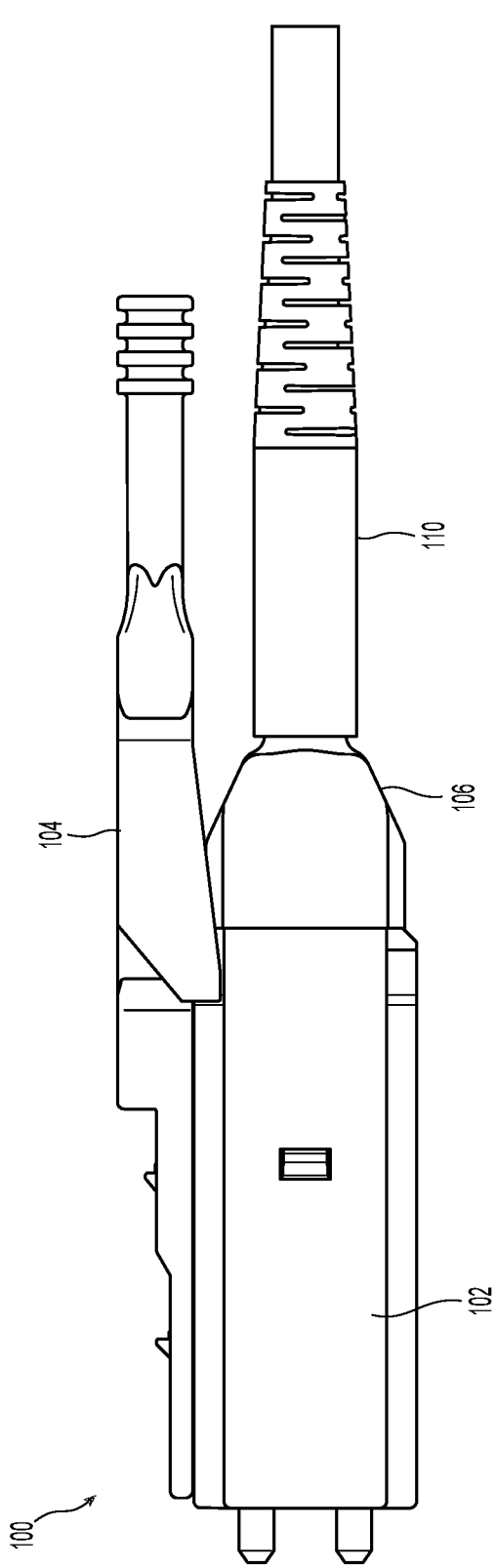
FIG. 1 is a side elevational view of one embodiment of a fiber optic connector with a push-pull mechanism, crimp body, and boot according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector would meet with another fiber optic connector or device, while the term "rear" or "rearward" is used to mean the direction from which the optical fibers enter into the fiber-optic ferrule or fiber optic connector. Thus, "front" is that part of the housing 102 on the left side of FIG. 1 and "forward" is out and to the left. "Rear" is that part of the housing 102 that is on the right side of the page and "rearward" is toward the right.

One embodiment of a fiber optic connector 100 according to the present invention is illustrated in FIGS. 1-22. The fiber optic connector 100, in FIGS. 1 and 2, may include a housing 102, a latch component (push-pull mechanism) 104, a crimp body 106, a crimp ring and heat shrink tube 108, and a strain relief boot 110. As discussed in more detail below, the housing 102 and its components, the latch component 104, and the crimp body 106 are the focus of this application. The crimp ring and heat shrink tube 108 and a strain relief boot 110 are generally known components.

Figure 3:
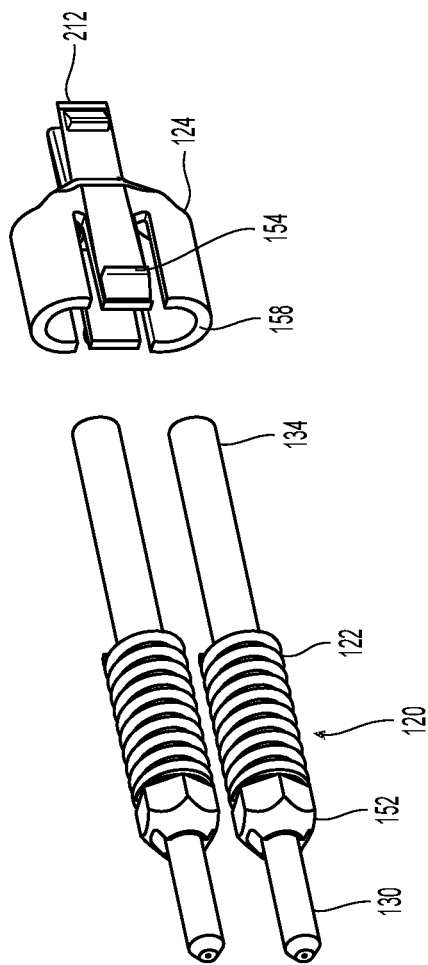
FIG. 3 is a perspective view of a portion of the fiber optic connector in FIG. 1, which includes the housing with two ferrule assemblies and a spring push.
Figure 3A:
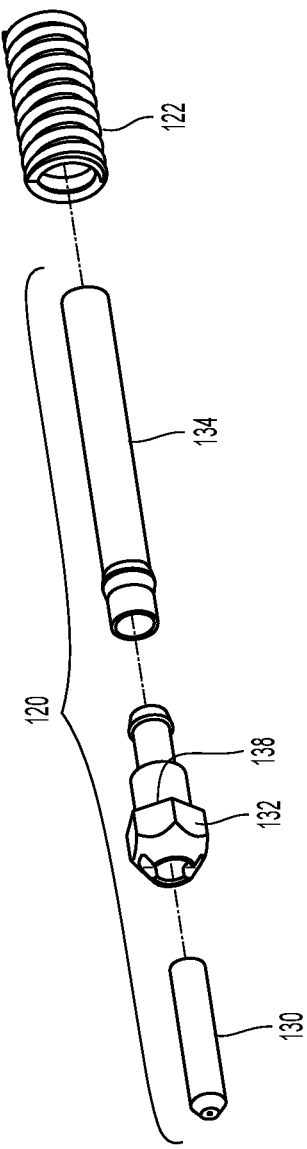
FIG. 3A is an exploded perspective view of the ferrule assembly and spring in FIG. 3.
Figure 4:
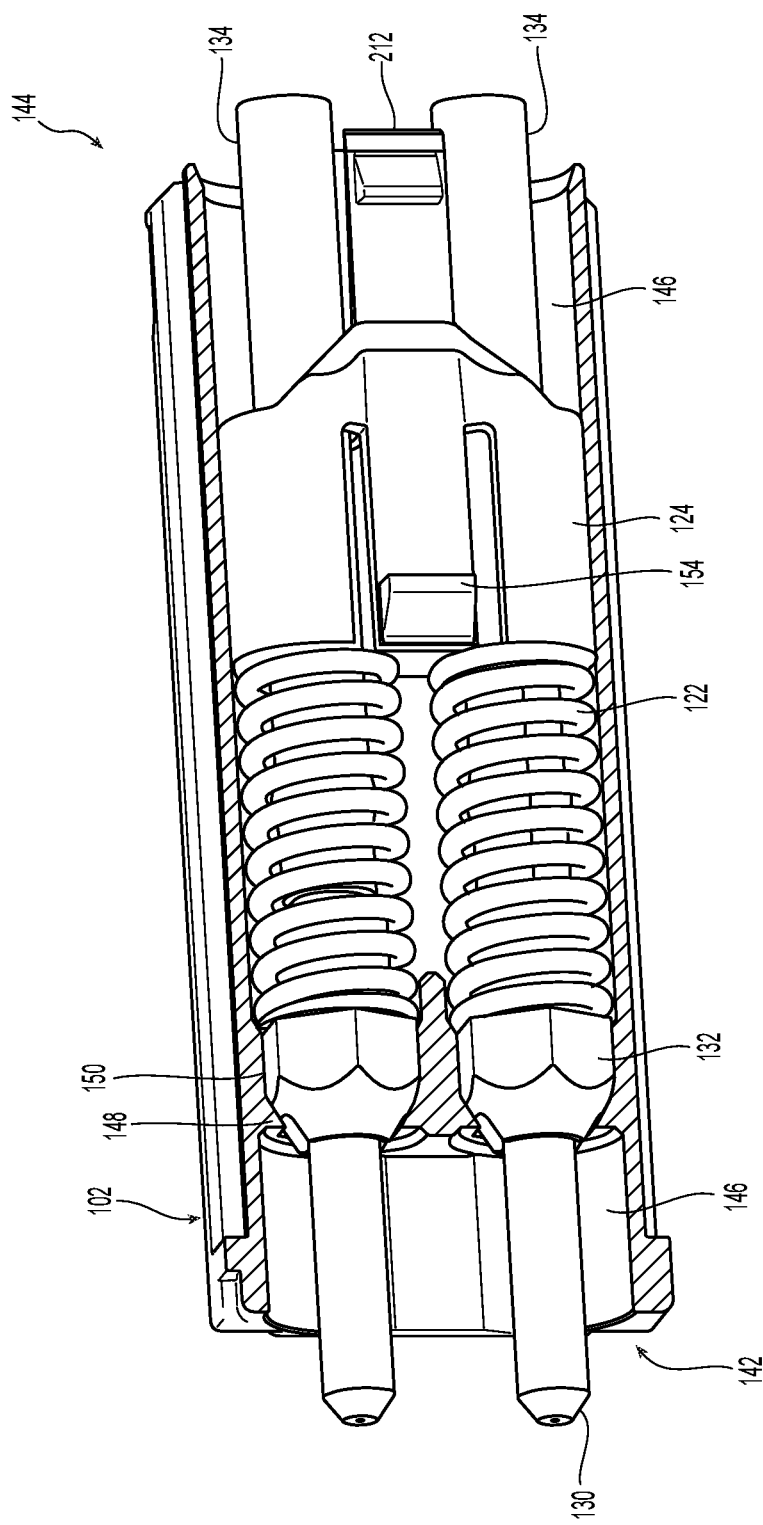
FIG. 4 is a partial cross section of the housing with two assembled ferrule assemblies and the spring push in FIG. 3.
Figure 7:
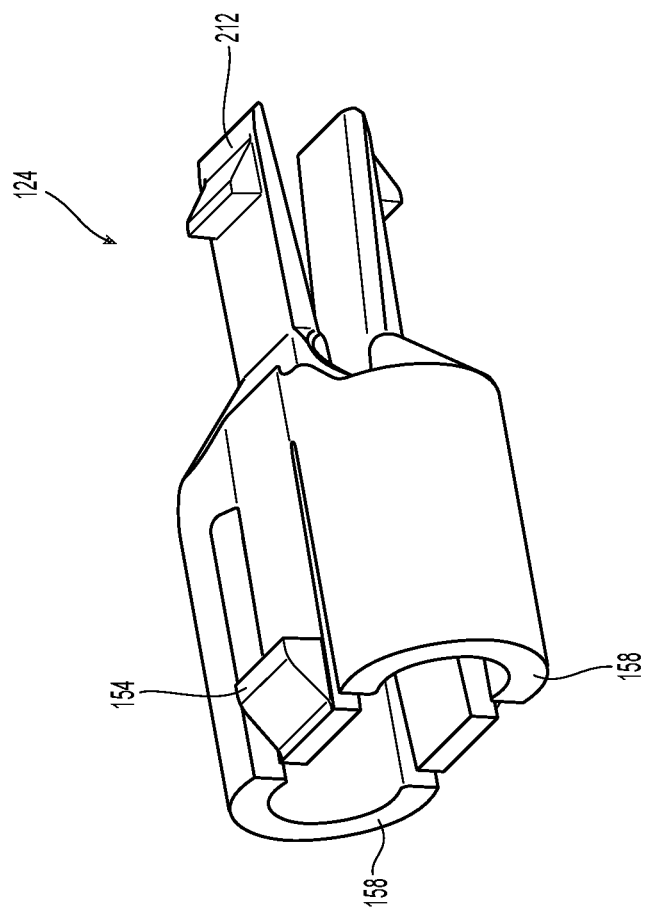
FIG. 7 is a perspective view of spring push in FIG. 3.

Turning to FIGS. 3 and 3A, inside the housing 102 are two ferrule assemblies 120, two springs 122, and a spring push 124. The two ferrule assemblies 120 each include a fiber optic ferrule 130 (generally a 1.25 mm LC fiber optic ferrule), a ferrule holder 132, and a lead-in tube 134. The spring 122 is added later. The ferrule assemblies 120 are preferably preassembled and are inserted into the housing 102 without needing any further processing.

The housing 102 has a main body 140 extending between a front end 142 and a rear end 144, and has an opening 146 extending therebetween. The opening 146 of the housing 102 may also have structures 148 that orient and retain the ferrule assemblies 120 in the housing 102. In this case, there are flat surfaces 150 that engage corresponding flat surfaces 152 on the ferrule holder 132, to keep the ferrule assemblies 120 from rotating within the housing 102.

Once the ferrule assemblies 120 are disposed within the housing 102, the springs 122 are placed around the lead-in tube 134 and against a back end 138 of the ferrule holder 132. The spring push 124 is then inserted into the opening 146 of the housing 102. The spring push 124 has a pair of latches 154 that engage corresponding openings 156 in the opposite sides of the main body 140 of the housing 102 to retain the spring push 124 in the opening 146. The spring push 124 has a forward facing surface 158 to engage the rear ends of the springs 122. The forward facing surface 158 generally corresponds to the two springs 122 to ensure that that the spring push 124 stays engaged with the springs 122. This configuration biases the ferrule assemblies 120 toward the front end 142 of the housing 102. While not shown, two optical fibers enter into the ferrule assemblies 120 through the spring push 124 and into the lead-in tubes 134.

The lead-in tubes 134 are connected to and extend from the ferrule holder 132. Preferably, the lead-in tubes 134 are secured to the ferrule holder 132, e.g. by adhesives, press-fit. The lead-in tubes 134 also extend beyond the rear end of the ferrule holder 132. See FIG. 4. This allows for injection of epoxy or other adhesives into the ferrule assemblies 120 through the lead-in tubes 134 to secure the optical fibers therein. With the lead-in tubes 134 extending so far rearwardly, there is no concern that the epoxy or adhesives will interfere with the springs 134, the spring push 124, or other structures in the fiber optic connector 100. Typically, the adhesive is cured with the lead-in tubes 134 exposed in prior to adding any additional components.

The housing 102 may also have an indicia 136 of the polarity of the fiber optic connector 100. See FIG. 5. Depending on the application, one of the ferrule assemblies 120 may be a receiving or a transmitting side with the other of the ferrule assemblies 120 being the other. It is important for the user or technician to know which of the ferrule assemblies 120 is which. The indicia 136, an indentation in this case, makes the orientation or the polarity of the fiber optic connector 100 clearly visible. Other types of indicia may be used and still fall within the scope of the present invention.

The outside of the housing 102 has many features that are integral to its use. See FIGS. 5 and 6. First are the top surface 160 and the bottom surface 162. The top and bottom surfaces 160,162 are preferably the same, with the exception of the indicia 1136, as one of the two surfaces 160,162 would not have it. Extending from the rear end 144 towards the front 142 of the housing 140 on both the top surface 160 and the bottom surface 162 is a rail receiving portion 164. As will be discussed in more detail below, the rail receiving portion 164 will stop just before the front end 142 as it will therefore create a stop surface 166. The latch component (push-pull mechanism) 104 will make use of the stop surface 166 to insert the fiber optic connector 100 into various structures.

The rail receiving portion 164 has a central portion 168 and then two lobe sections 170, one lobe on each side of the central portion 168. As best seen in FIG. 6, the rail receiving portion 164 looks like part of a profile of a dog bone. This configuration matches that of the bottom surface of the latch component (push-pull mechanism) 104 to form a sliding dove-tail configuration. Other configurations are possible, such as, for example, the second version illustrated below—a cap with undercuts (essentially an umbrella or a T-shape configuration). See FIG. 26.

The next feature of the housing 102 and main body 140 are the two side surfaces 180. The two side surfaces 180 are those opposite to one another and separated by the top surface 160 and the bottom surface 162. Referring to FIG. 6 in particular, each of the sides 180 are divided into three portions. The first portion is a longitudinal central portion 182 extending in a first plane A. The second portion is a longitudinal top portion 184 extending in a second plane B, the first plane A is parallel to and offset from the second plane B. The third portion is a longitudinal bottom portion 186 extending in the second plane B. The longitudinal top portion 184 preferably is divided from the longitudinal central portion 182 by a shoulder 188. The shoulder 188 preferably has a surface that is in plane C and is perpendicular to both planes A and B. Similarly, the longitudinal bottom portion 186 preferably is divided from the longitudinal central portion 182 by a shoulder 190. The shoulder 190 preferably has a surface that is in plane D and is perpendicular to both planes A and B.

The two longitudinal top portions 184 and the two longitudinal bottom portions 186 function to align the fiber optic connector 100 in a horizontal direction in various structures, e.g., a carrier and an adapter. On the other hand, it is the shoulders 188,190 that align the fiber optic connector 100 in a vertical direction. These will be discussed in more detail below. See also FIGS. 19 and 20.

Referring to FIG. 5, there are also two indentations 192 in the longitudinal top portion 184 on both sides of the main body and adjacent the rear end 144. The indentations 192 form a forward facing surfaces 194 that are used by two housing latches in the latch component (push-pull mechanism) 104. As described more later, the latch component (push-pull mechanism) 104 engages the forward facing surfaces 194 when removing the fiber optic connector 100.

Figure 2:
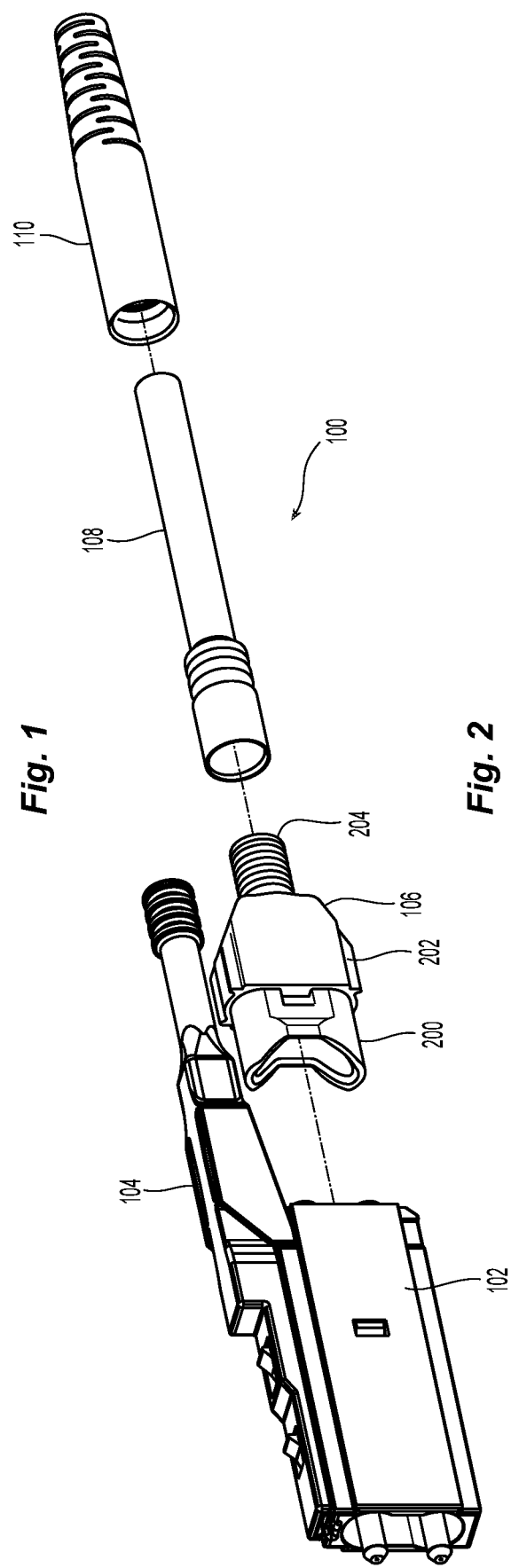
FIG. 2 is an exploded perspective view of the fiber optic connector in FIG. 1.
Figure 9:
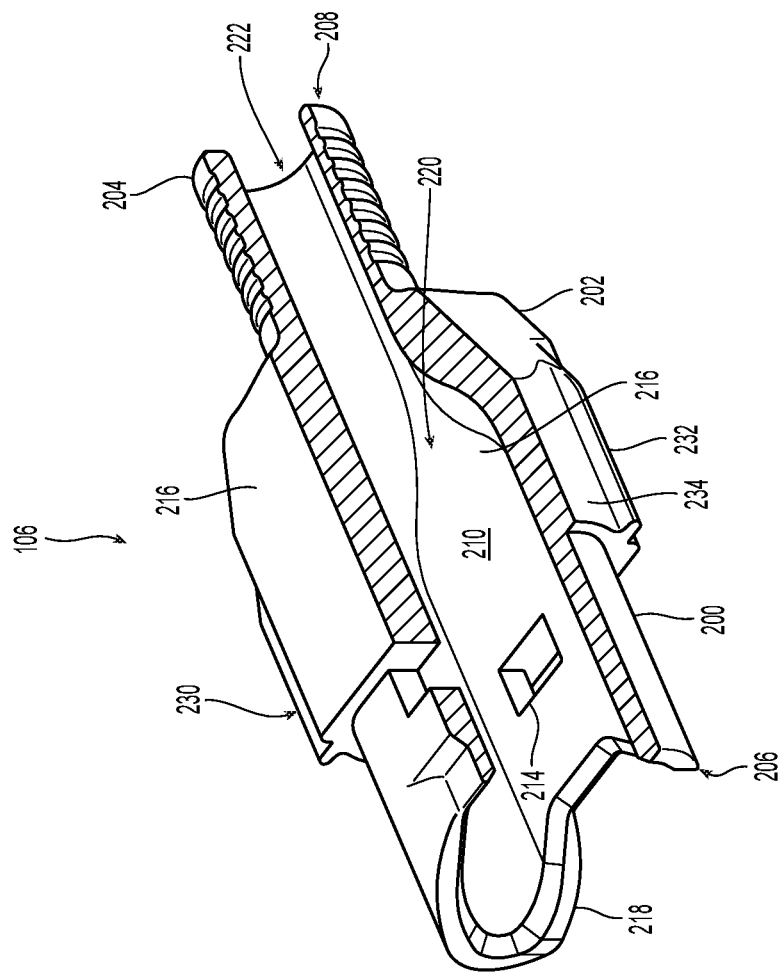
FIG. 9 is a partial cut away perspective view of the crimp body in FIG. 8.
Figure 8:
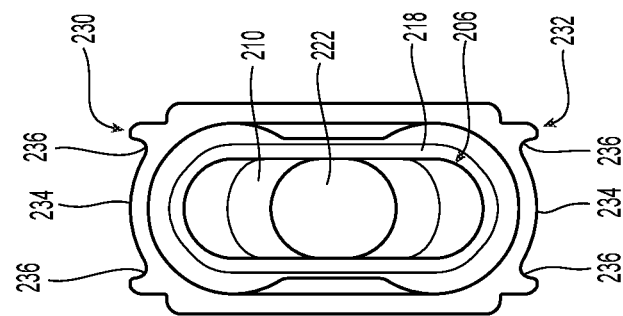
FIG. 8 is a front elevational view of the crimp body in FIG. 1.
Figure 13:
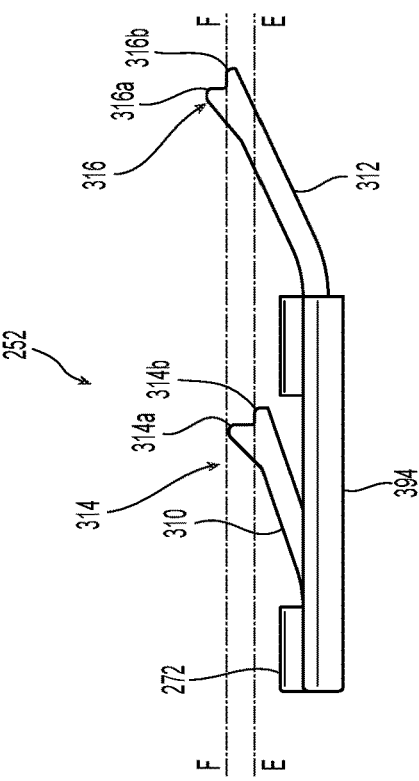
FIG. 13 is a side elevational view of the latch body in FIG. 11.
Figure 12:
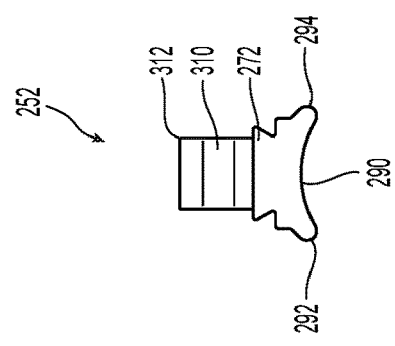
FIG. 12 is a front elevational view of the latch body in FIG. 11.
Figure 11:
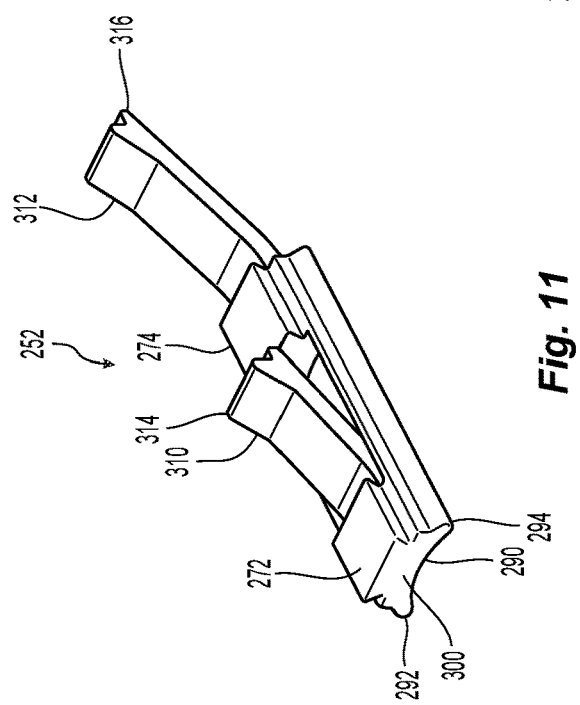
FIG. 11 is a perspective view of a latch body used with the push-pull mechanism in FIG. 10.
Figure 14:
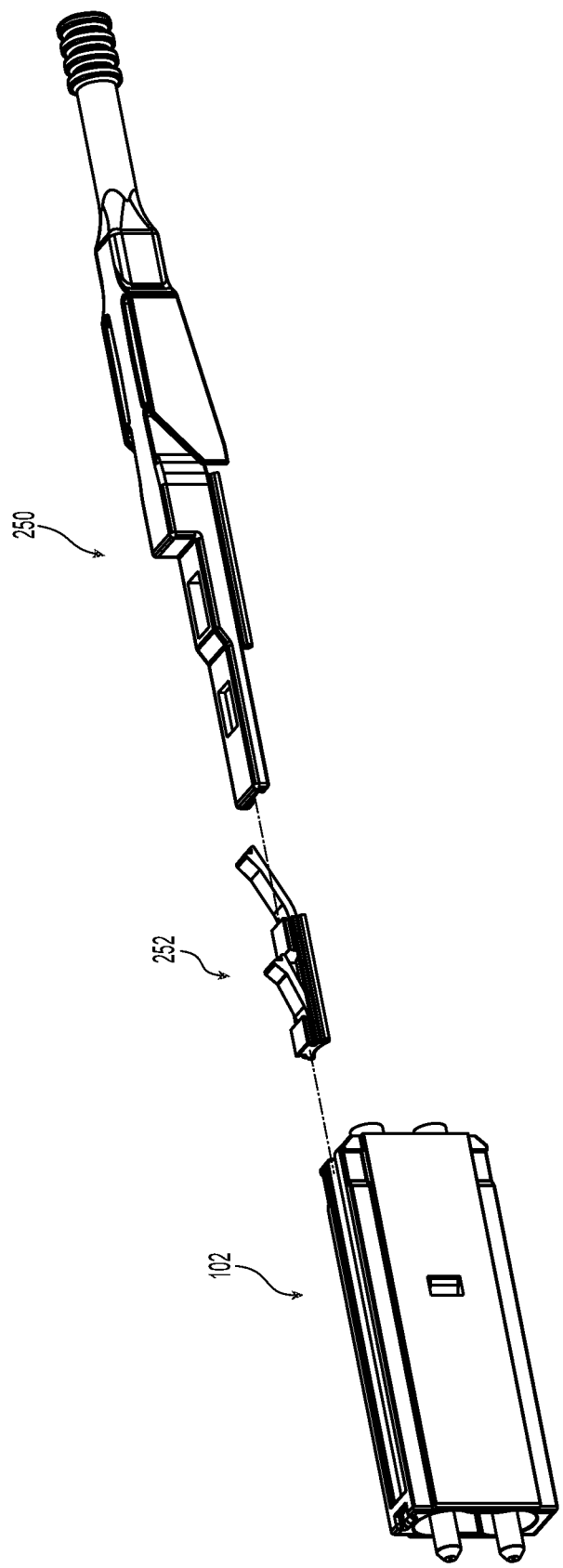
FIG. 14 is a perspective view of the push-pull mechanism and latch body illustrating how the latch body attaches to the push-pull mechanism.
Figure 15:
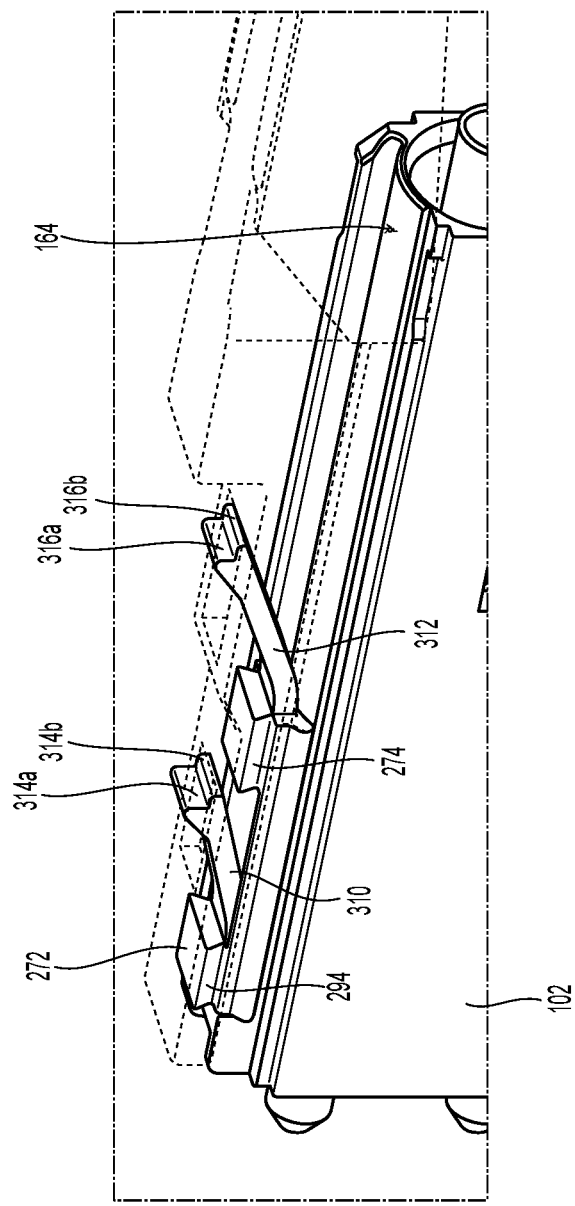
FIG. 15 is a partial, perspective view of the push-pull mechanism and latch body in FIG. 14.
Figure 16:
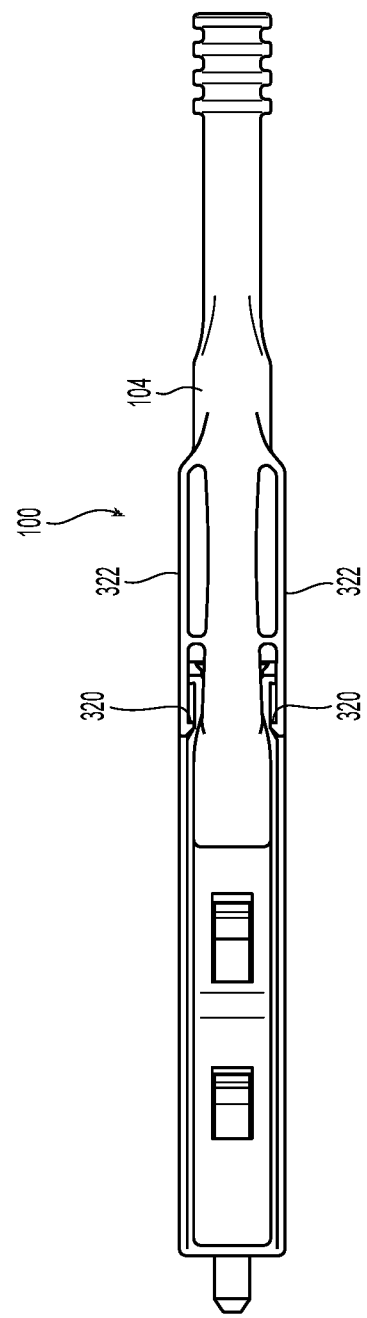
FIG. 16 is a top view of the push-pull mechanism in FIG. 14 attached to the fiber optic connector in FIG. 1.
Figure 17:
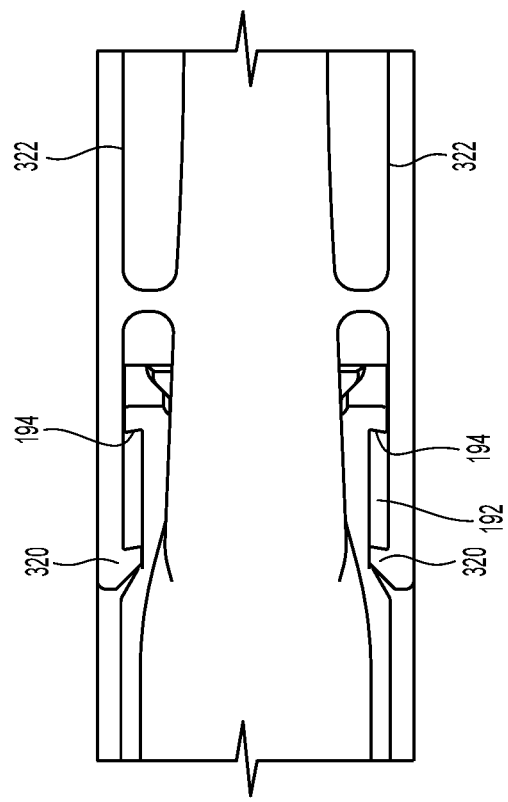
FIG. 17 is an enlarged view of the connection of the push-pull mechanism and housing in FIG. 16.
Figure 18:
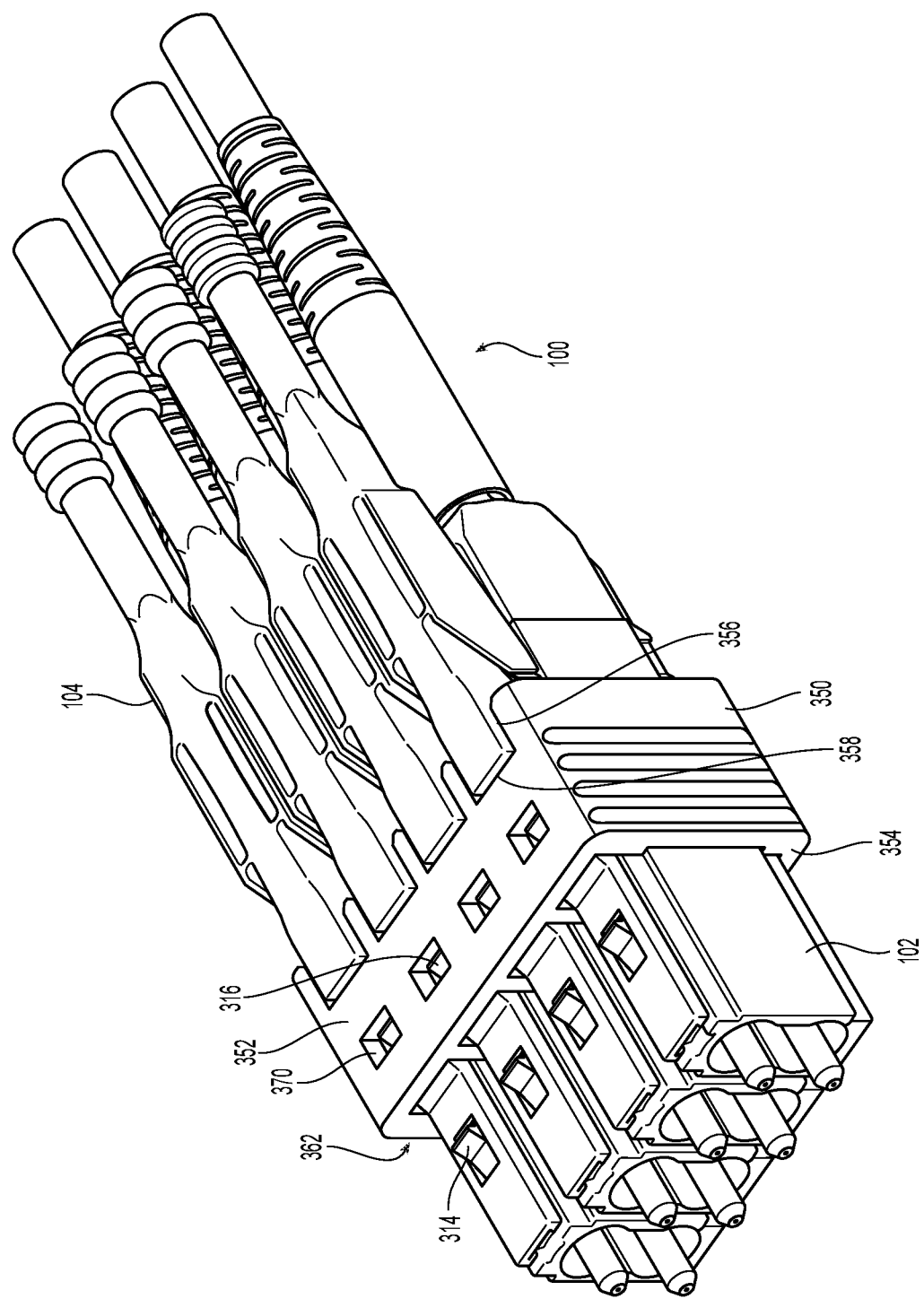
FIG. 18 is a front perspective view of a plurality of fiber optic connectors and push-pull mechanisms mounted in a carrier according to one embodiment of the present invention.

Returning to the crimp body 106, it is illustrated in FIG. 1 and also in FIGS. 8 and 9. The crimp body 106 has a front portion 200 that is designed to interact and connect with the spring push 124 and also is disposed within the opening 146 of the housing 102 when installed. The crimp body 106 has a rear portion 202 that extends behind the housing 102 and provides an outer surface 204 to receive a crimp band (e.g., crimp ring and heat shrink tube 108) therearound. Extending from a front end 206 to the rear end 208 is an opening 210. The opening 210 at the front portion 200 receives at least a portion of each of the lead-in tubes 134. The spring push 124 has two tabs 212 on opposites sides thereof and extend in a rear ward direction in the opening 210 to engage an opening 214 in side walls 216 of the crimp body 106. The front end 206 also has a forward facing surface 218 that complements the rear of the spring push and, together with the tabs 212 keeps the crimp body 106 securely fixed to fiber optic connector 100. Although the crimp body 106 is illustrated as being attached to the spring push 124, alternatively the crimp body 106 could be attached to the housing 102.

The opening 210 in the crimp body 106 rearwardly of the lead-in tubes provides a transition area 220 for the optical fibers that are secured in the fiber optic ferrules 130. Since the crimp body 106 has a singular opening 222 at the rear end thereof, the optical fibers need to be able to exit that singular opening 222 in a smooth fashion so they are not bent beyond their bend radius, thereby damaging or breaking the optical fibers. The transition area 220 provides for this function.

The crimp body 106 also has a top surface 230 and the bottom surface 232. The top surface 230 and the bottom surface 232 may be configured with a central portion 234 that is similar to the central portion 168 of the rail receiving portion 164 above. However, the crimp body 106 has two outer trough portions 236 that are open to the space above the crimp body 106. The central portion 234 and the two outer trough portions 236 function as an alignment feature of the rail receiving portion 164. As discussed more below, the latch component (push-pull mechanism) 104 can be better aligned with the rail receiving portion 164 by using the central portion 234 and the two outer trough portions 236 on the crimp body 106.

While the crimp body 106 is illustrated as a single, unitary body (i.e., molded at one time with one material), it could also be molded as two pieces and then later the two pieces secured to one another.

The latch component (push-pull mechanism) 104 is illustrated in more detail in FIGS. 10-17. The latch component (push-pull mechanism) 104 has a main body 250 and a latch body 252 that attaches to the main body 250. See FIGS. 10 and 11-13. The main body 250 has a front portion 254, a middle portion 256, and a rear portion 258. Generally, the front portion 254 is where the latch body 252 attaches to the main body 250 and provides for the latching of the fiber optic connector 100 to the adapter and carrier. The middle portion 256 provides for latching of latch component (push-pull mechanism) 104 to the housing 102. The rear portion 258 has a grasping portion 260 to allow a user to push and pull the latch component (push-pull mechanism) 104 to engage and disengage the fiber optic connector 100 and the latch component (push-pull mechanism) 104 from the adapter and/or carrier.

The front portion 254 is divided into a first front portion 262 and a second front portion 264. The first front portion 262 and the second front portion 264 both have a window 266, 268, respectively to receive a latch from the latch body 252 therethrough. An underside of the first portion 262 has a groove 270 on either side to receive attachment members 272, 274 from the latch body 252 (see FIGS. 10A and 11) to secure the latch body 252 to the main body 250. The attachment members 272, 274 (and thus the latch body 252) are able to slide within the grooves 270 to allow for the latching and unlatching the fiber optic connector 100. The grooves 270 should extend the length of the first portion 254.

The second front portion 264 has an upper surface 276 that is higher than an upper surface 278 of the first front portion 262. This allows for the latching of a carrier and an adapter with the same device, as noted in more detail below. On the bottom side 280 of the second front portion 264 is a rail portion 282 that includes two extensions 284, 286 that are joined by a central portion 288, all having a complementary configuration of the rail receiving portion 164 of the housing 102. See FIG. 10A. The latch body 252 also has the same rail portion configuration (central portion 290 and two extensions 292, 294) on the bottom thereof. This allows the main body 250 and the latch body 252 to be slidingly attached to the rail receiving portion 164 of housing 102. When the latch body 252 is inserted into the first front portion 262, a front surface 296 of the rail portion 282 provides a pushing surface by which the main body 250 can push the latch body 252 in the rail receiving portion 164 of the housing 102. See also FIG. 21. The front surface 300 of the latch body 252 also provides a pushing surface to be used against the stop surface 166 of the housing 102. This allows for the user to exert a force on the latch component (push-pull mechanism) 104 which is transferred through the main body 250 to the latch body 252 and to the housing 102 to insert the fiber optic connector 100 into a carrier and/or adapter.

Returning to FIGS. 11-13, the latch body 252 has two latches, an adapter latch 310 and a carrier latch 312. The latch body may only have one of the latches, depending upon its uses and the needs of the user. The adapter latch 310 extends from a forward portion of the latch body 252 and protrudes through window 266 of the main body 250. The carrier latch 312 also extends from the latch body 252, from a rear portion thereof, and protrudes through the window 268 of the main body 250. As is recognized from FIG. 13, the adapter latch 310 does not rise as high as the carrier latch 312 (plane E versus plane F) so that when the fiber optic connector 100 is inserted into or removed from a carrier, the adapter latch 310 will not engage the carrier.

Each of the latches, adapter latch 310 and a carrier latch 312, each have a proximal end 314, 316, to engage an adapter and a carrier, respectively. Each of the proximal ends, 314, 316, have a rearward facing surface 314a, 316a and an upward facing surface, 314b, 316b. The proximal ends 314, 316 will engage an opening in an adapter or a carrier. See, e.g., FIG. 21.

The latch component (push-pull mechanism) 104 is removably connected to the rail receiving portion 164 of the housing 102 as described above. However, the connections so far described do not prevent the latch component (push-pull mechanism) 104 from being removed toward the rear of the housing 102 when, for example, the grasping portion 260 is pulled rearwardly. However, in the middle portion 256, there are two latches 320 that extend from the latch component (push-pull mechanism) 104 inward and will move along rear portions of the longitudinal top portions 184 on each side of the housing 102. See FIGS. 1, 18, and 20. In particular, the housing 102 has indentations 192 for the latches 320 and will engage the forward facing surfaces 194 when the latch component (push-pull mechanism) 104 is pulled rearwardly. This will allow for the user to remove the fiber optic connector 100 from a carrier and/or adapter as will now be described. It should be noted that the latches 320 are cantilevered latches and thus pushing on area 322 (see FIGS. 16 and 17) will cause the latches to move away from the housing 102, and will release the housing 102 from the latch component (push-pull mechanism) 104.

Figure 20:
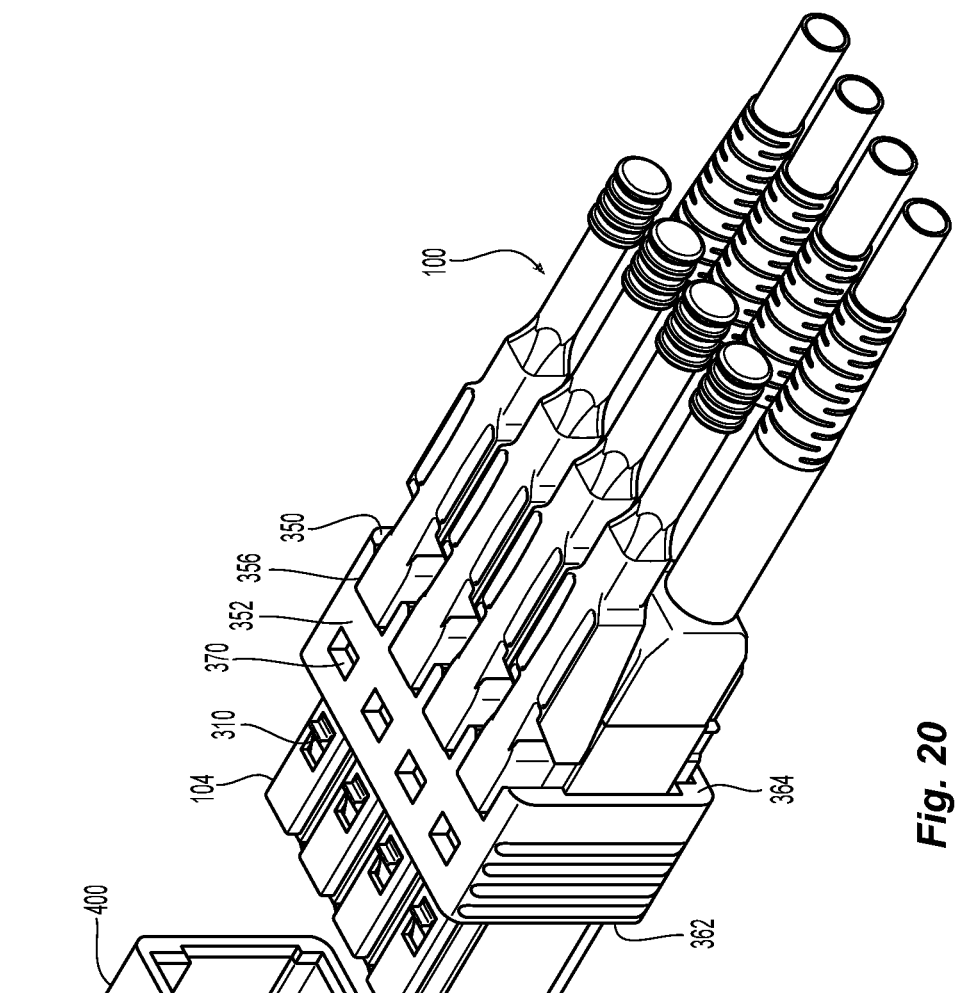
FIG. 20 is a rear perspective view of the plurality of fiber optic connectors and push-pull mechanisms mounted in the carrier in FIG. 18 in preparation to be inserted into one embodiment of a fiber optic connector adapter according to the present invention.

Turning to FIGS. 1, 14, 15, and 18, the latch component (push-pull mechanism) 104 is connected to the fiber optic connector 100. The fiber optic connector 100 can be inserted into a carrier 350 (FIG. 18) and/or an adapter 400 (FIG. 20). The carrier 350 provides the user with a convenient way to insert into and remove 4 fiber optic connectors 100 (could also have more or fewer connectors, but usually in groups of two) from an adapter (or other telecommunications structure) rather than one at a time. It provides a cost savings time wise and also assists in preventing the stubbing of or breaking fiber optic connectors.

The carrier 350 has a few features that enable the use of the carrier 350 to correctly orient the fiber optic connectors 100 (polarity) and also to align the fiber optic connectors 100 to one another for insertion into the adapter. The carrier 350 has a top 352 and a bottom 354 and the top 352 has a cut out 356 for each of the fiber optic connectors 100, or the latch component (push-pull mechanism) 104. If the fiber optic connector 100 is inserted into the carrier 350 incorrectly (wrong polarity) then the fiber optic connector 100 will not seat in the carrier 350 correctly. The cut out 356 also has a rearward facing surface 358 that is used to remove all of the fiber optic connectors 100 from an adapter as discussed in more detail below.

Figure 19:
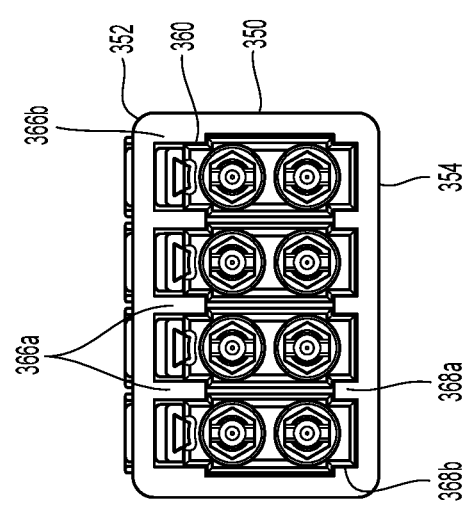
FIG. 19 is a front view of the plurality of fiber optic connectors and push-pull mechanisms mounted in the carrier in FIG. 18.
Figure 21:
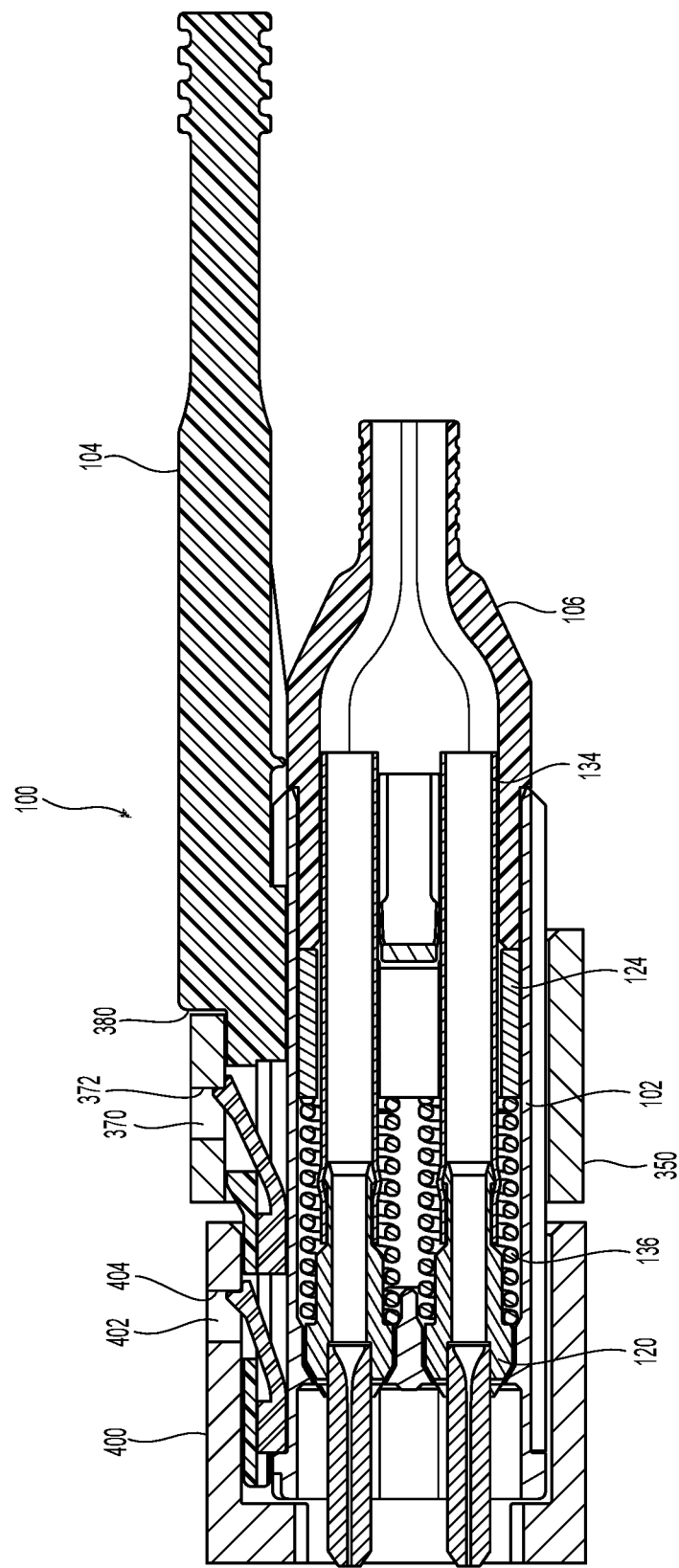
FIG. 21 is a cross section of the assembly of the push-pull mechanism and latch body and the fiber optic connector, all mounted in the carrier and inserted into the adapter.
Figure 22:
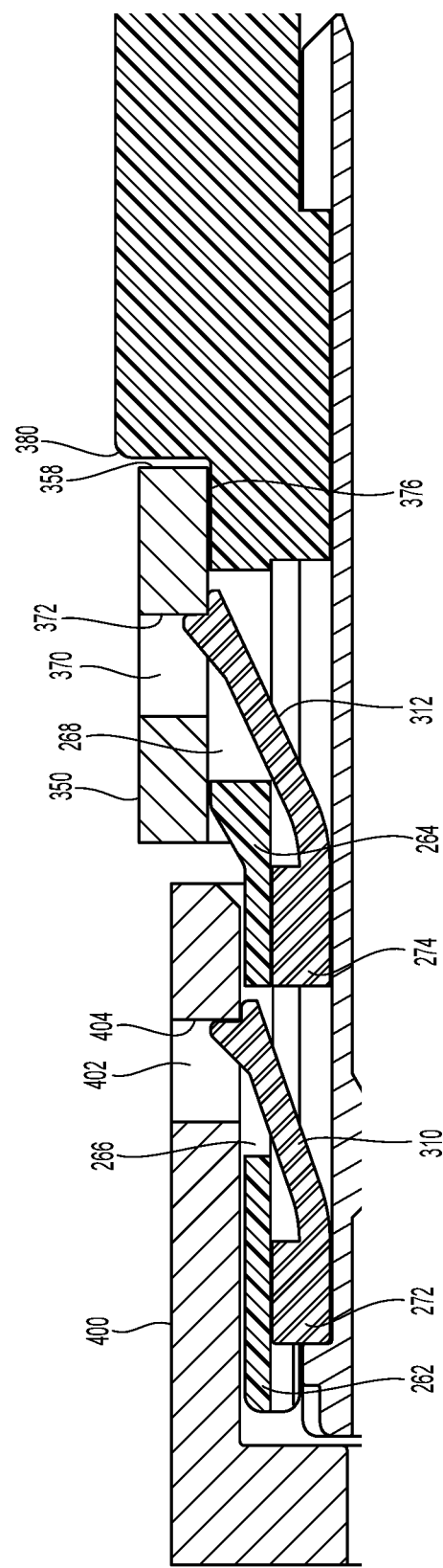
FIG. 22 is a cross section of a smaller portion of the assembly shown in FIG. 21 illustrating push-pull mechanism and latch body mounted in the carrier and the fiber optic connector adapter.

The carrier 350 has an opening 360 extending between the front end 362 and the rear end 364. Inside the opening 360 are projections to accurately orient the fiber optic connectors 100 in the carrier 350. Extending from the top 352 into the opening 360 are the top extensions 366a. Along the corner of the top and the sides of the carrier 350 are partial top extensions 366b, which perform the same function as top extensions 366a. Similarly, there are bottom extensions 368a and partial bottom extensions 368b. As best seen in FIG. 19, the top extensions 366a are longer and extend down into the opening 360 farther than the bottom extensions 368a extend upward into the opening 360. The distance between corresponding top and bottom extensions 366a, 368a provide the vertical alignment of the fiber optic connector 100 within the carrier 350. Referring back to FIG. 6, the shoulders 188 and 190 and, more particularly, the distance between them and their vertical location along the sides 180 of the housing 102 orients the fiber optic connectors 100 vertically within the carrier 350. As can be gleamed from FIG. 19, if one of the fiber optic connectors 100 is oriented incorrectly, the longitudinal top portions 184 and the two longitudinal bottom portions 186 will be in the incorrect location and the latch component (push-pull mechanism) 104 will hit the carrier and prevent the fiber optic connector 100 from being fully inserted.

The horizontal alignment of the fiber optic connectors 100 is also controlled by the top extensions 366a and the bottom extensions 370. However, it is the longitudinal top portions 184 and the two longitudinal bottom portions 186 (the distance therebetween) engaging the top extensions 366a and the bottom extensions 370 that controls. FIG. 19 also shows that there is very limited space between the fiber optic connectors 100 and allows for a higher density of fiber optic connectors 100.

Once the fiber optic connectors 100 with the latch component (push-pull mechanism) 104 are correctly inserted into the carrier 350, a latch stop 380 on the latch component (push-pull mechanism) 104 will engage the rearward facing surface 358 of the carrier 350. The carrier 350 is captured between the latch stop 380 and rearward facing surface 316a of carrier latch 312. This will expose enough of the latch component (push-pull mechanism) 104 and, in particular, the first front portion 262. At the same time, the top 352 of the carrier 350 has windows 370 to receive the carrier latch 312 from each latch body 252, and in particular the proximal end 316. See FIGS. 21 and 22. However, as the fiber optic connector 100 passes into the and through carrier 350, the adapter latch 310 is too short to engage the carrier 350.

With the carrier latch 312 now in the window 370 and engaging surface 372 created by the window 370, the carrier 350 or the latch component (push-pull mechanism) 104 can be used to insert the fiber optic connectors 100 into the adapter 400. As clear from FIGS. 21 and 22, if the carrier 350 is used to insert the ganged fiber optic connectors 100 (in the carrier 350 in FIG. 20), then the carrier 350 will push on the carrier latch 312, which is on the latch body 252 and has front surface 300 of the latch body 252, which then pushes against the stop surface 166 of the housing 102 to secure the ganged fiber optic connectors 100. Thus, all of the fiber optic connectors 100 will be pushed simultaneously into the adapter. On the other hand, one could also used the latch component (push-pull mechanism) 104 to insert them as well.

As the ganged fiber optic connectors 100 are inserted into the adapter 400, each of the adapter latches 310 will pop up into a respective window 402. With the adapter latch 310 now in the window 402 and engaging surface 404 created by the window 402, the ganged fiber optic connectors 100 are secured within the adapter 400. The adapter 400 has the same projections to accurately orient the fiber optic connectors 100 in the adapter 400. Thus, applicant will not repeat the same structures here.

The fiber optic connectors 100 can be removed from the adapter 400 one at a time or all at the same time with the carrier 350. To remove one fiber optic connector 100 from the adapter 400 (if only in the adapter) or the adapter 400 and the carrier 350, one only need to pull on the grasping portion 260 of the latch component (push-pull mechanism) 104. As the latch component (push-pull mechanism) 104 is pulled backward, it moves rearward relative to the latch body 252 (because the adapter latch 310 and the carrier latch 312 are against the engaging surfaces 372, 404, respectively) and the portions forward of the windows 266, 268, will move over the adapter latch 310 and a carrier latch 312, pushing them down and out of the windows 370, 402. Continued pulling on the grasping portion 260 of the latch component (push-pull mechanism) 104 causes the latches 320 to engage the forward facing surfaces 194 of the housing 102 and the whole fiber optic connector can be removed.

If the ganged fiber optic connectors 100 are to be removed together and only from the adapter 400, then the user will pull on the carrier 350 (while the adapter 400 remains fixed relative thereto). The carrier 350 and, in particular, the rearward facing surface 358 will engage latch stop 380 on the latch component (push-pull mechanism) 104 of each of the fiber optic connectors 100. As noted above, the portions forward of the windows 266, 268, will move over adapter latch 310 (and carrier latch 312, but the carrier 350 will retain the fiber optic connectors 100), pushing them down and out of the windows 370, 402. Continued pulling on the carrier causes the latches 320 to engage the forward facing surfaces 194 of the housing 102 and all of the ganged fiber optic connectors 100 can be removed from the adapter 400. The fiber optic connector 100 can be inserted into and removed the same adapter 400 without a carrier 350 present. A partially populated carrier in the adapter can how a single fiber optic connectors removed for install, while the carrier will stay connected to the fiber optic connectors that remain in the adapter. When the last fiber-optic connector is removed is from the adapter, it will bring the carrier with it.

Figure 23:
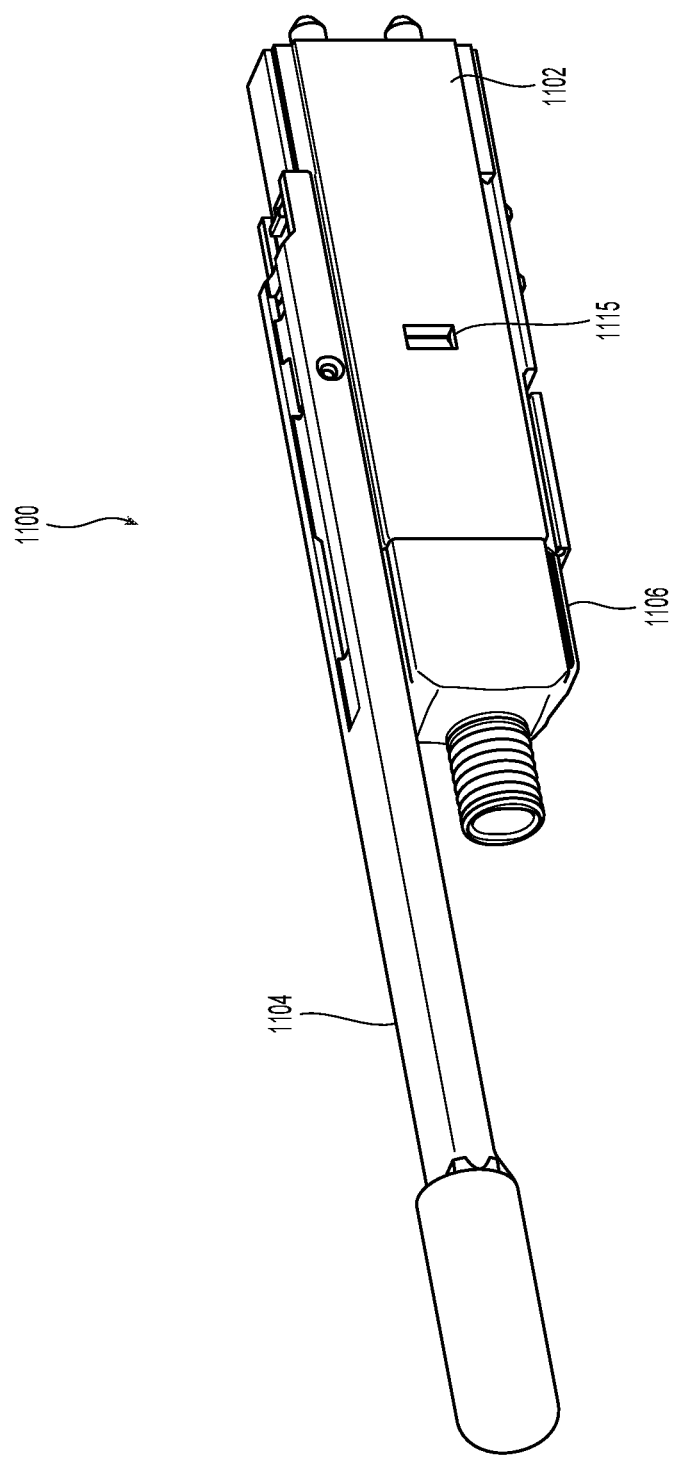
FIG. 23 is an elevational view of a second embodiment of a fiber optic connector with a push-pull mechanism, crimp body, and boot according to the present invention.

A second embodiment of a fiber optic connector 1100 according to the present invention is illustrated in FIGS. 23-36. The fiber optic connector 1100, in FIG. 23, may include a housing 1102, a latch component (push-pull mechanism) 1104, and a crimp body 1106. As discussed in more detail below, the housing 1102 and its components, the latch component 1104, and the crimp body 1106 are the focus here. It is also preferred that there by a crimp ring and heat shrink tube and a strain relief boot as with the prior embodiment, but since the crimp ring and heat shrink tube and a strain relief boot are generally known components, they are omitted here for clarity.

Figure 24:
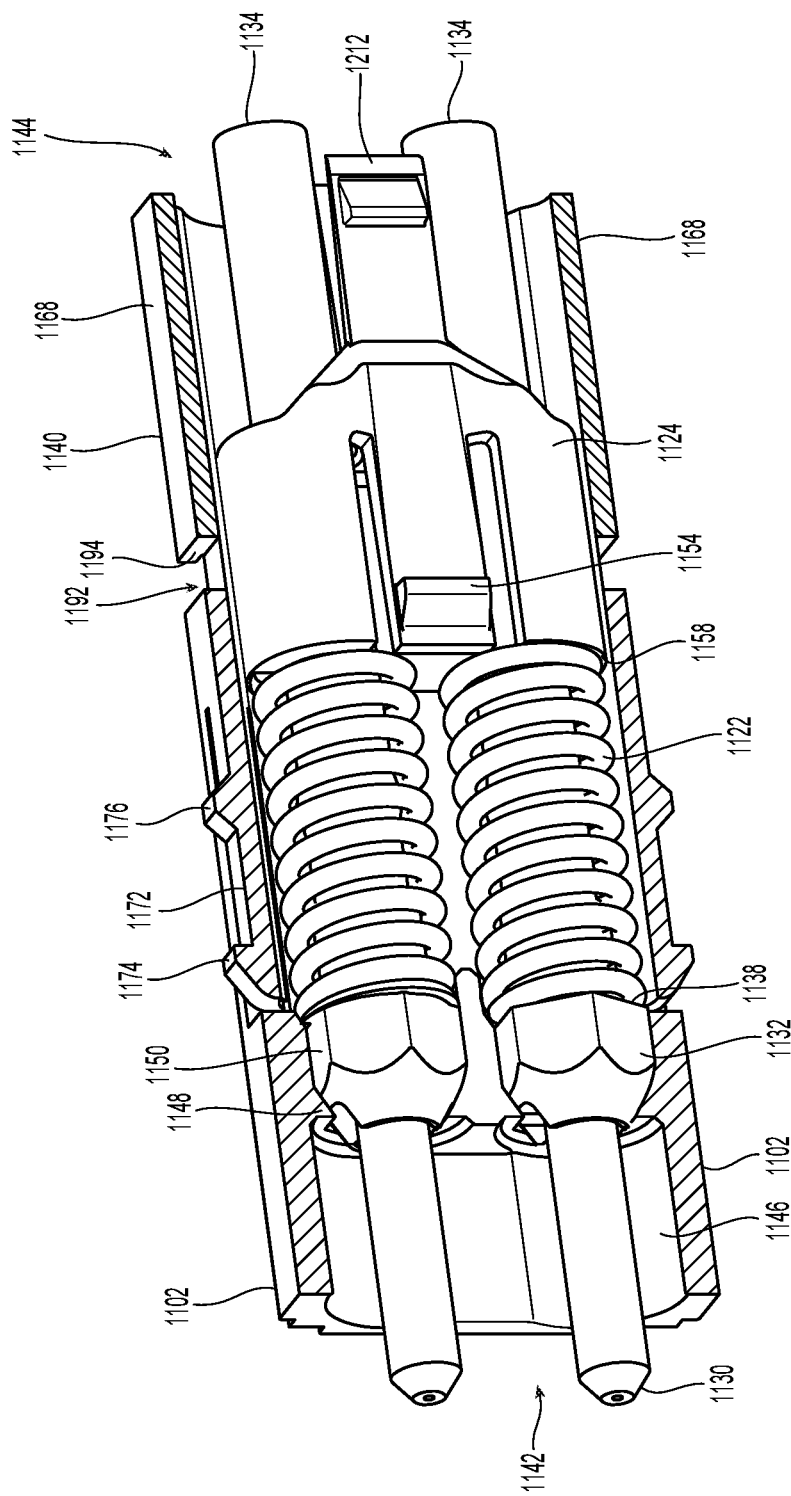
FIG. 24 is a partial cross sectional view of the housing with the two ferrule assemblies and a spring push of the fiber optic connector in FIG. 23.
Figure 27:
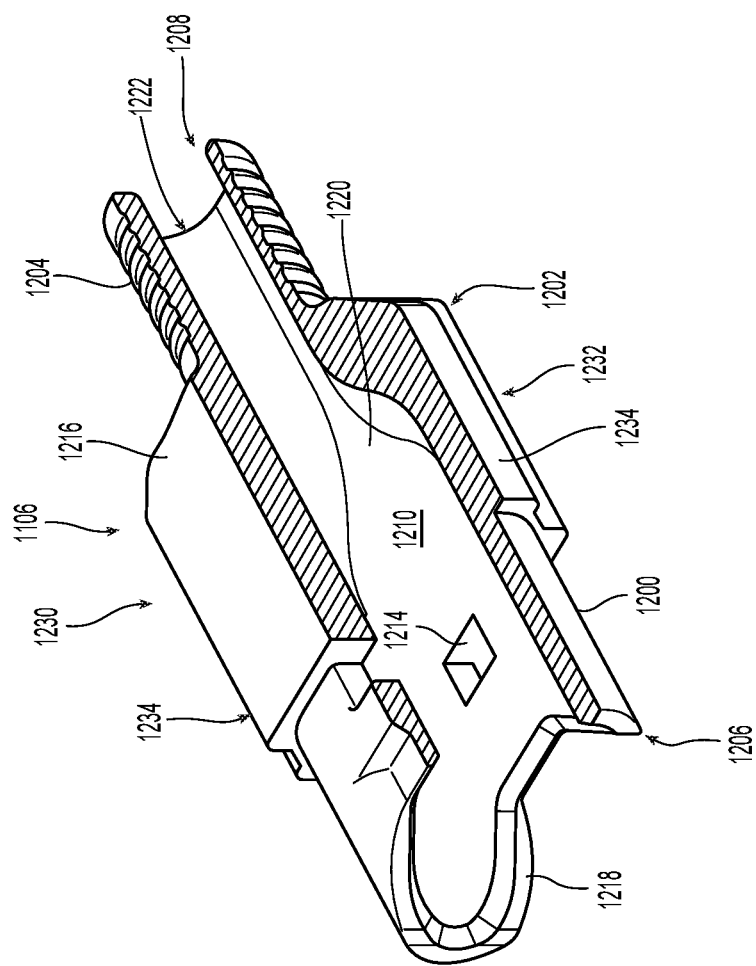
FIG. 27 is partial cross section of a second embodiment of a crimp body according to the present invention and shown in FIG. 23.

Turning to FIG. 24, inside the housing 1102 are two ferrule assemblies 1120 (which may be the same as ferrule assemblies 120), two springs 1122, and a spring push 1124. The two ferrule assemblies 1120 each include a fiber optic ferrule 1130 (generally a 1.25 mm LC fiber optic ferrule), a ferrule holder 1132, and a lead-in tube 1134. The spring 1122 is added later. The ferrule assemblies 1120 are preferably preassembled and are inserted into the housing 1102 without needing any further processing.

The housing 1102 has a main body 1140 extending between a front end 1142 and a rear end 1144, and has an opening 1146 extending therebetween. The opening 1146 of the housing 1102 may also have structures 1148 that orient and retain the ferrule assemblies 1120 in the housing 1102. In this case, there are flat surfaces 1150 that engage corresponding flat surfaces 1152 on the ferrule holder 1132, to keep the ferrule assemblies 1120 from rotating within the housing 1102.

Once the ferrule assemblies 1120 are disposed within the housing 1102, the springs 1122 are placed around the lead-in tube 1134 and against a back end 1138 of the ferrule holder 1132. The spring push 1124 is then inserted into the opening 1146 of the housing 1102. The spring push 1124 has a pair of latches 1154 that engage corresponding openings 1156 in the opposite sides of the main body 1140 of the housing 1102 to retain the spring push 1124 in the opening 1146. The spring push 1124 has a forward facing surface 1158 to engage the rear ends of the springs 1122. The forward facing surface 1158 generally corresponds to the two springs 1122 to ensure that that the spring push 1124 stays engaged with the springs 1122. This configuration biases the ferrule assemblies 1120 toward the front end 1142 of the housing 1102. While not shown, two optical fibers enter into the ferrule assemblies 1120 through the spring push 1124 and into the lead-in tubes 1124.

The lead-in tubes 1134 are connected to and extend from the ferrule holder 1132. Preferably, the lead-in tubes 1134 are secured to the ferrule holder 1132, e.g. by adhesives, press-fit. The lead-in tubes 1134 also extend beyond the rear end of the ferrule holder 132 and the springs 1122 and the spring push 1124. See FIG. 24. This allows for injection of epoxy or other adhesives into the ferrule assemblies 1120 through the lead-in tubes 1134 to secure the optical fibers therein. With the lead-in tubes 1134 extending so far rearwardly, there is no concern that the epoxy or adhesives will interfere with the springs 1122, the spring push 1124, or other structures in the fiber optic connector 1100.

The housing 1102 may also have an indicia of the polarity of the fiber optic connector 1100 as with the prior embodiment. Similarly, an indentation or other mark may be present on the housing 1102.

The outside of the housing 1102 has many features that are integral to its use. See FIGS. 25 and 26. First are the top surface 1160 and the bottom surface 1162. The top and bottom surfaces 1160,1162 are preferably the same, but may have some differences and still fall within the scope of the present invention. Extending from the rear end 1144 towards the front 1142 of the housing 11020 on both the top surface 1160 and the bottom surface 1162 is a rail receiving portion 1164. As will be discussed in more detail below, the rail receiving portion 1164 will stop before the front end 1142 as it will therefore create a stop surface 1166. The latch component (push-pull mechanism) 1104 will make use of the stop surface 1166 to insert the fiber optic connector 1100 into various structures.

The rail receiving portion 1164 has a central portion 1168 and two lobe sections 1170, one lobe on each side of the central portion 1168. As best seen in FIG. 26, the rail receiving portion 1164 has a T-shape configuration. This configuration matches that of the bottom surface of the latch component (push-pull mechanism) 1104 to form a sliding configuration. Other configurations are possible, as noted above.

The next feature of the housing 1102 and main body 1140 are the two side surfaces 1180. The two side surfaces 1180 are those opposite to one another and separated by the top surface 1160 and the bottom surface 1162. Referring to FIG. 26 in particular, each of the sides 1180 are divided into at least three portions. The first portion is a longitudinal central portion 1182 extending in a first plane G. The second portion is a longitudinal top portion 1184 extending in a second plane H, the first plane G is parallel to and offset from the second plane H. The third portion is a longitudinal bottom portion 1186 extending in the second plane H. The longitudinal top portion 1184 preferably is divided from the longitudinal central portion 1182 by a shoulder 1188. The shoulder 1188 preferably has a surface that is in plane I and is perpendicular to both planes G and H. Similarly, the longitudinal bottom portion 1186 preferably is divided from the longitudinal central portion 1182 by a shoulder 1190. The shoulder 1190 preferably has a surface that is in plane J and is perpendicular to both planes G and H. There is also an inclined wall 1196 between the bottom of the central portion 1168 and the shoulder 1188. A portion of the latch component (push-pull mechanism) 1104 uses this inclined wall 1196 as a reference surface while moving along the housing 1102. See FIG. 26. The inclined wall 1196 ends at the stop surface 1166, where the latch component (push-pull mechanism) 1104 engages the stop surface 1166 to move the fiber optic connector 1100 as discussed below.

The two longitudinal top portions 1184 and the two longitudinal bottom portions 1186 function to align the fiber optic connector 1100 in a horizontal direction in various structures, e.g., a carrier and an adapter. On the other hand, it is the shoulders 1188,1190 that align the fiber optic connector 1100 in a vertical direction as was discussed in detail above. As such, this discussion is not included here.

Also on the top surface 1160 and the bottom surface 1162 is a latch 1172 with an engagement surface 1174 and a release ramp 1176. The latch 1172 is a cantilevered latch that works with the latch component (push-pull mechanism) 1104 to engage and disengage from an adapter. Finally, on the top surface 1160 and the bottom surface 1162 is an opening 1192 in the rail receiving portion 1164 for an extension from the latch component (push-pull mechanism) 1104. As described in more detail below, the extension from the latch component (push-pull mechanism) 1104 engages a forward facing surface 1194 to remove the fiber optic connector 1100 from the adapter and or carrier. See FIG. 24.

The crimp body 1106 has a front portion 1200 that is designed to interact and connect with the spring push 1124 and also is disposed within the opening 1146 of the housing 1102 when installed, which is usually after the epoxy used to secure the optical fibers in the ferrules 1130 has cured. The crimp body 1106 has a rear portion 1202 that extends behind the housing 1102 and provides an outer surface 1204 to receive a crimp band (e.g., crimp ring and heat shrink tube) therearound. Extending from a front end 1206 to the rear end 1208 is an opening 1210. The opening 1210 at the front portion 1200 receives at least a portion of each of the lead-in tubes 1134. The spring push 1124 has two tabs 1212 (FIG. 24) on opposites sides thereof and extend in a rearward direction in the opening 1210 to engage an opening 1214 in side walls 1216 of the crimp body 1106. The front end 1206 also has a forward facing surface 1218 that complements the rear of the spring push 1124 and, together with the tabs 1212, keeps the crimp body 1106 securely fixed to fiber optic connector 1100.

The opening 1210 in the crimp body 1106 rearwardly of the lead-in tubes provides a transition area 1220 for the optical fibers that are secured in the fiber optic ferrules 1130. Since the crimp body 1106 has a singular opening 1222 at the rear end thereof, the optical fibers need to be able to exit that singular opening 1222 in a smooth fashion so they are not bent beyond their bend radius, thereby damaging or breaking the optical fibers. The transition area 1220 provides for this function.

The crimp body 1106 also has a top surface 1230 and the bottom surface 1232. The top surface 1230 and the bottom surface 1232 may be configured with an area 1234 that complements the central portion 1168 and two lobe sections 1170 of the rail receiving portion 1164 above. The area 1234 functions as an alignment feature of the rail receiving portion 1164. As discussed more below, the latch component (push-pull mechanism) 1104 can be better aligned with the rail receiving portion 1164 by using the area 1234 on the crimp body 1106.

While the crimp body 1106 is illustrated as a single, unitary body (i.e., molded at one time with one material), it could also be molded as two pieces and then later the two pieces secured to one another.

Figure 28:
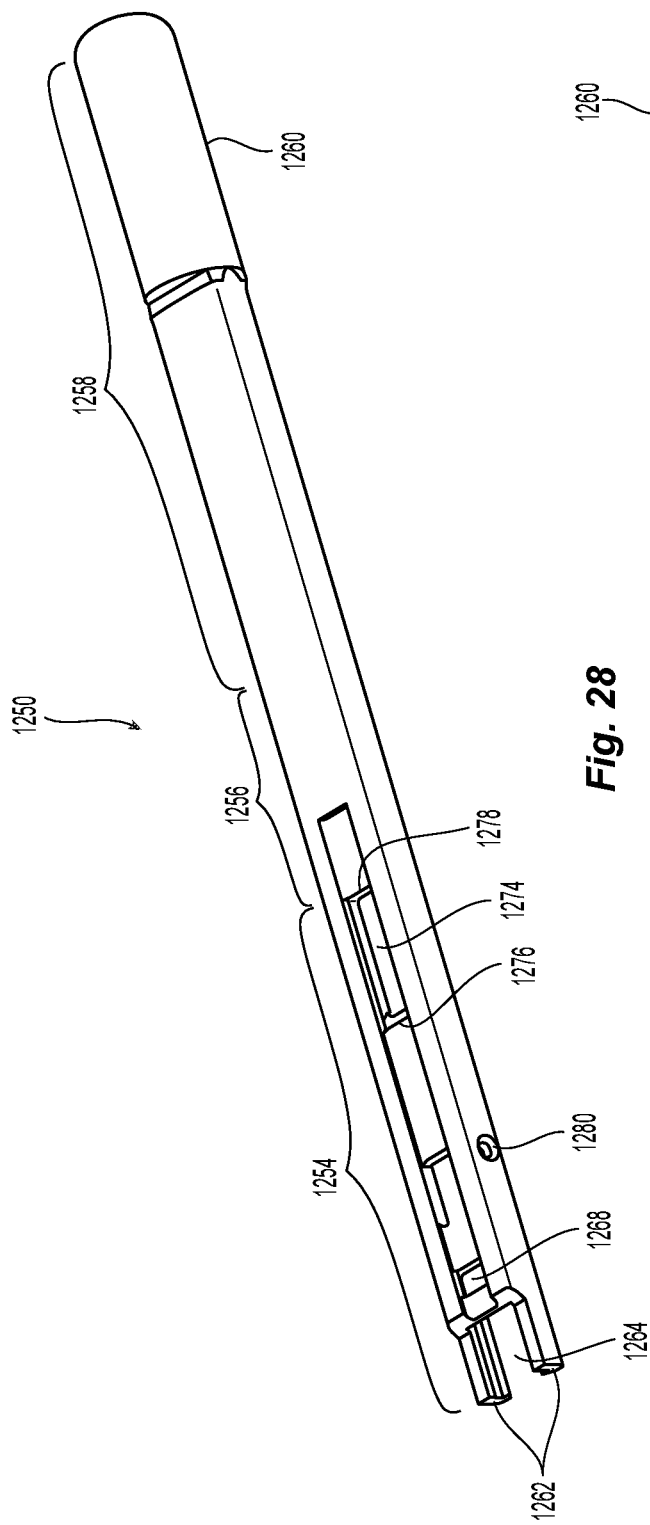
FIG. 28 is a perspective view of the second embodiment of a push-pull mechanism according to the present invention and shown in FIG. 23.
Figure 29:
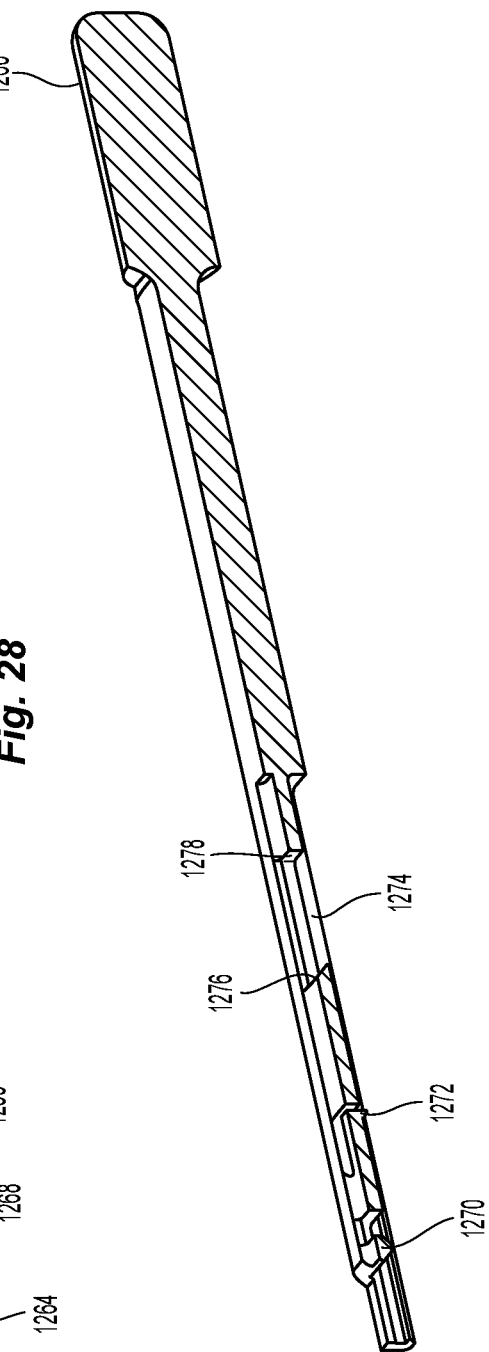
FIG. 29 is a cross section view of the push-pull mechanism in FIG. 27.

The latch component (push-pull mechanism) 1104 is illustrated in more detail in FIGS. 28-29. The latch component (push-pull mechanism) 1104 has a main body 1250, with a front portion 1254, a middle portion 1256, and a rear portion 1258. Generally, the front portion 1254 is where the latch component 1104 engages the fiber optic connector 1100 and controls connections to an adapter and carrier. The middle portion 1256 generally provides for latching of latch component (push-pull mechanism) 1104 to a carrier. The rear portion 1258 has a grasping portion 1260 to allow a user to push and pull the latch component (push-pull mechanism) 1104 to engage and disengage the fiber optic connector 1100 (push-pull mechanism) 1104 from the adapter and/or carrier.

When the latch component (push-pull mechanism) 1104 is installed on the housing 1102, the front portion 1254 has two rails 1262 to engage the stop surface 1166 to push the fiber optic connector 1100. Pushing on the latch component (push-pull mechanism) 1104 causes the force to be transferred to the rails 1262. There is a space 1264 between the rails 1262 to allow for the engagement surface 1174 of the latch 1172 to pass therebetween. The front portion 1254 then, moving rearwardly, has an opening 1268. The opening 1268 receives the release ramp 1176. A front portion of the opening 1268 has a chamfered surface 1270 to engage the chamfered surface of the release ramp 1176. See also FIGS. 28 and 29. Behind the opening 1268 is a downward extension 1272 to fit within the opening 1192 in the rail receiving portion 1164 and to engage the forward facing surface 1194 when removing the fiber optic connector 1100 as discussed below. See also FIG. 24.

The next feature of the latch component (push-pull mechanism) 1104 is in the middle portion 1256 and is an opening 1274 that receives a part of a carrier for a number of fiber optic connectors 1100. As noted above, sometimes it is beneficial for a number of fiber optic connectors 1100 to be linked to one another. This opening 1274 along with another embodiment of a carrier 1350 allows for the insertion/removal of the fiber optic connectors 1100 from an adapter 1400. The opening 1274 is partially formed by a chamfered front surface 1276 and a generally flat rear surface 1278.

The rear portion 1258 of the latch component (push-pull mechanism) 1104 has a grasping portion 1260. Finally, a release 1280 is disposed on the side of the latch component (push-pull mechanism) 1104. The release 1280 is an opening that provides access to the downward extension 1272 that fits within the opening 1192. As noted above, the downward extension 1272 keeps the latch component (push-pull mechanism) 1104 positioned with the housing 1102. To disengage the latch component (push-pull mechanism) 1104 from the housing 1102, a pin or other small tool can be inserted into the release 1280 and deflect downward extension 1272 upward and out of the opening 1192. The latch component (push-pull mechanism) 1104 can now be moved rearwardly from the housing 1102.

Figure 30:
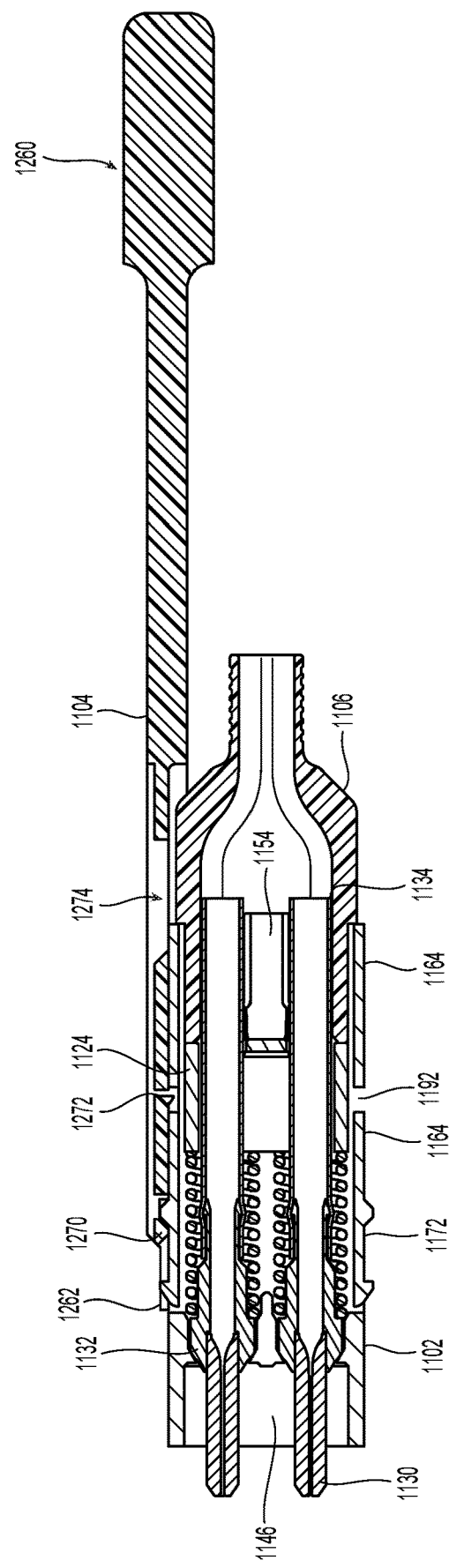
FIG. 30 is cross section of the fiber optic connector with a push-pull mechanism and crimp body of FIG. 23.
Figure 31:
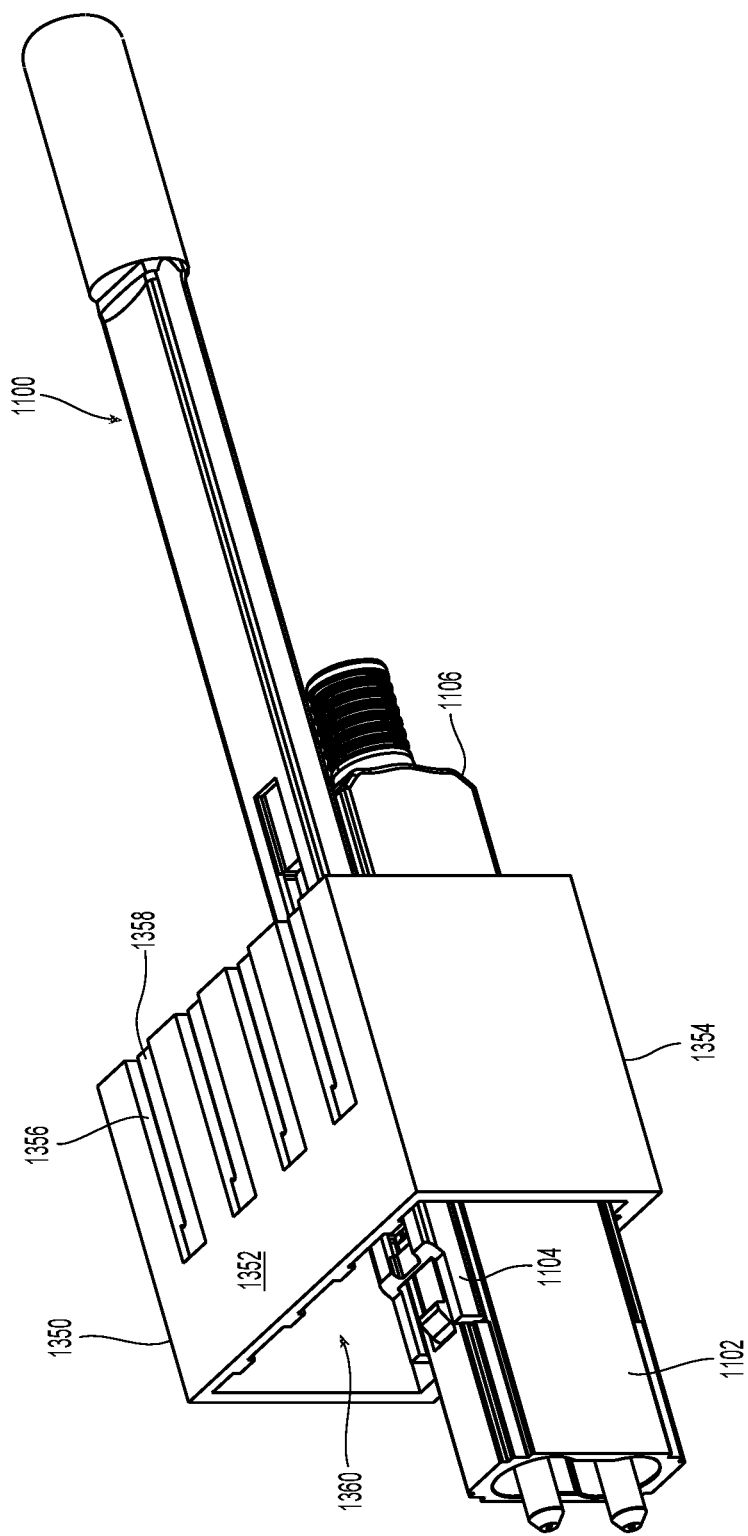
FIG. 31 is a perspective view of a fiber optic connector and push-pull mechanisms of FIG. 23 mounted in a carrier.
Figure 32:
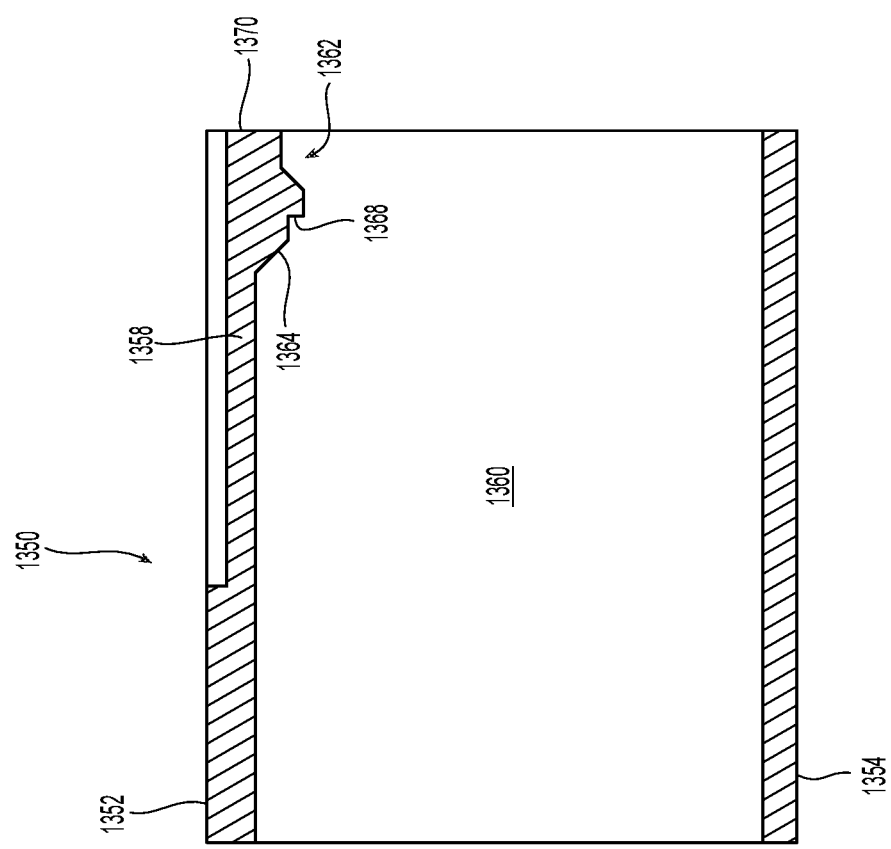
FIG. 32 is a cross section view of the carrier of FIG. 30 without the fiber optic connector.

FIG. 30 illustrates the fiber optic connector 1100 fully assembled and ready to be used. The major components of the fiber optic connector 1100 are labeled and the latch component (push-pull mechanism) 1104 in position to insert the fiber optic connector 1100 into a carrier 1350 and/or an adapter 1400. As can be seen, the latch component (push-pull mechanism) 1104 is fully engaged and the two rails 1262 have engaged the stop surface 1166.

Figure 33:
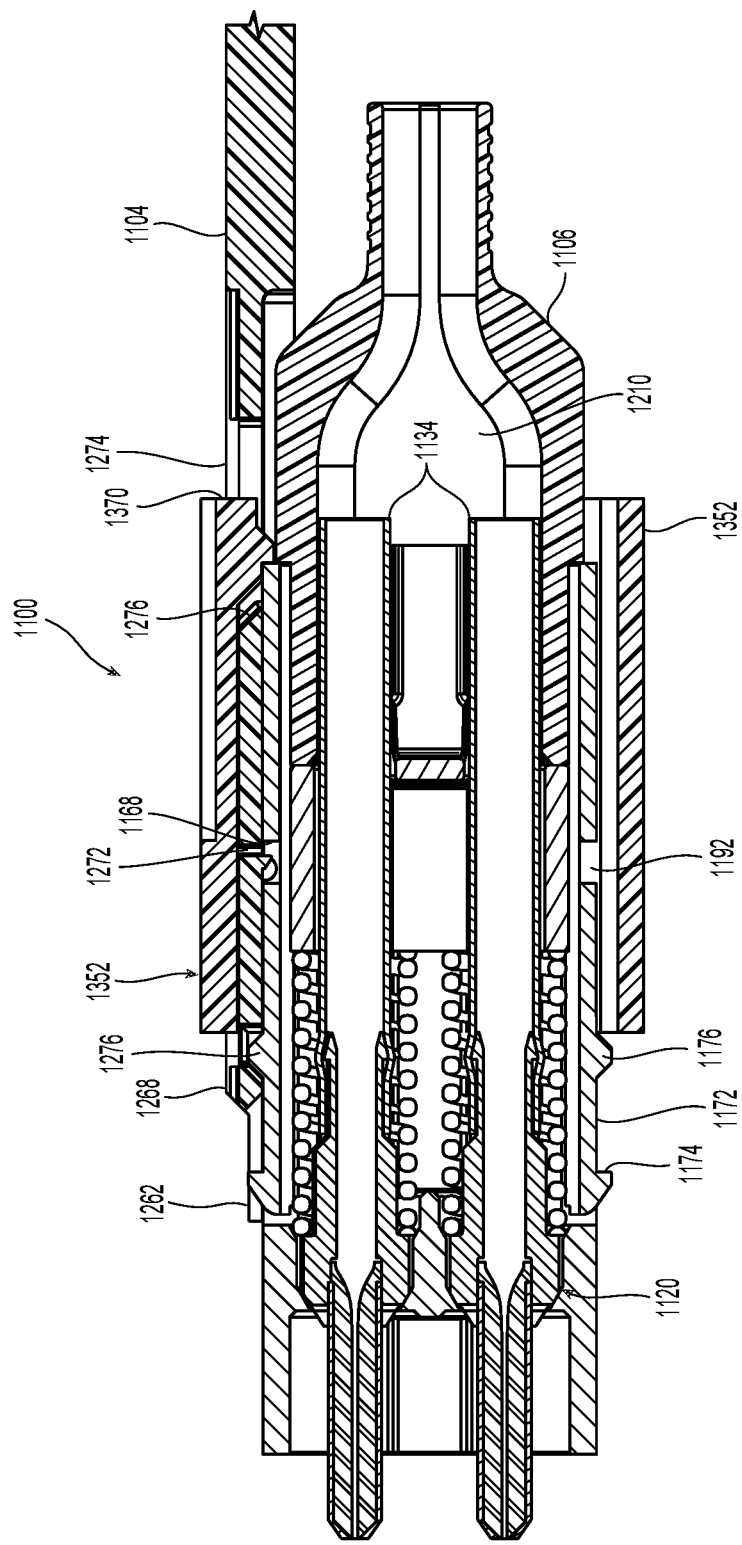
FIG. 33 is a cross section view of the fiber optic connector with a push-pull mechanism and crimp body of FIG. 23 in an embodiment of a carrier.
Figure 34:
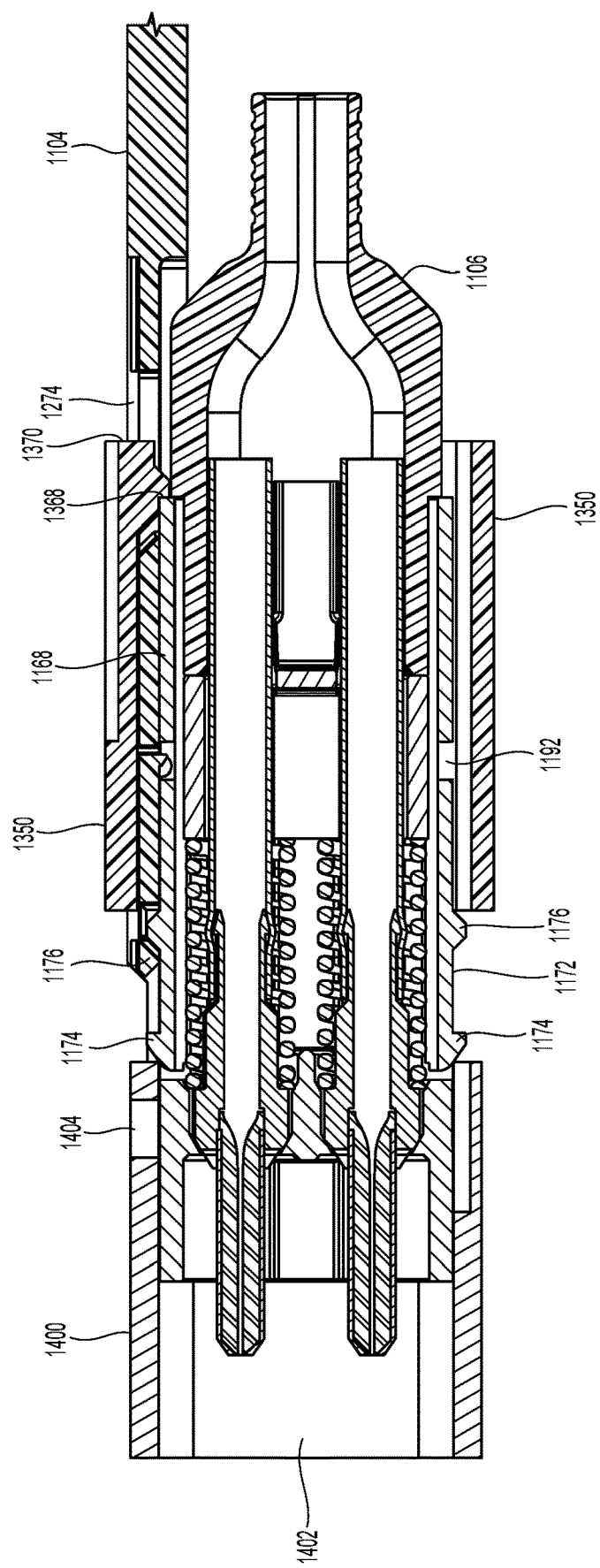
FIG. 34 is a cross section view of fiber optic connector with a push-pull mechanism and crimp body in a carrier being inserted into an adapter.

Turning to FIGS. 30, 31, 33, and 36, the fiber optic connector can be inserted into a carrier 1350 (FIGS. 30 and 31) and/or an adapter 1400 (FIG. 34). The carrier 1350 provides the user with a convenient way to insert into and remove 4 fiber optic connectors 1100 (could also have more or fewer connectors, but usually in groups of two) from an adapter (or other telecommunications structure) rather than one at a time. It provides a cost savings time wise and also assists in preventing the stubbing of or breaking fiber optic connectors.

The carrier 1350 has a few features that enable the use of the carrier 1350 to correctly orient the fiber optic connectors 1100 (polarity) and also to align the fiber optic connectors to one another for insertion into the adapter. The carrier 1350 has a top 1352 and a bottom 1354 and the top 1352 has a cut out 1356 for each of the fiber optic connectors 1100, or the latch component (push-pull mechanism) 1104. Each of the cut outs 1356 has a cantilevered latch 1358 that protrudes into an opening 1360 of the carrier 1350. If the fiber optic connector 1100 is inserted into the carrier 1350 incorrectly (wrong polarity) then the fiber optic connector 1100 will not seat in the carrier 1350 correctly. The combination of the latch 1358 and the bottom 1354 prevent the fiber optic connectors 1100 from being inserted incorrectly. The cantilevered latches 1358 have a projection 1362 that extends into the opening 1360 (FIG. 32) and, when a fiber optic connector is inserted, rests in the opening 1274. The first surface 1364 of projection 1362 is chamfered and is to engage the chamfered front surface 1276 of the latch component (push-pull mechanism) 1104 during removal of the fiber optic connector 1100. The forward facing surface 1368 used to engage a rear surface of the housing 1102 when the carrier 1350 is used to insert the fiber optic connectors 1100 into the adapter 1400. Finally, the rear facing surface 1370 used to engage the generally flat rear surface 1278 of opening 1274 when the carrier 1350 is used to remove the fiber optic connectors 1100 from the adapter 1400.

Installation of the fiber optic connector 1100 into the carrier 1350 is illustrated in FIG. 33. Using the latch component (push-pull mechanism) 1104, the fiber optic connector 1100 is inserted into the carrier 1350 because the two rails 1262 to engage the stop surface 1166 thereby pushing the fiber-optic connector 1100 through the carrier 1350. The release ramp 1176 is disclosed in the opening 1268 of the front portion 1254. Similarly, the projection 1362 on the latch 1358 is disposed in the opening 1274 of the latch component (push-pull mechanism) 1104. This method is repeated for each of the fiber optic connectors 1100 that are to be inserted into the carrier 1350.

The fiber optic connectors 1100 can be inserted into the adapter 1400 is illustrated in FIG. 34. As with the prior embodiment, fiber optic connectors 1100 can be inserted into the adapter 1400 one at a time, or in multiples using the carrier 1350. Once the fiber of the connectors are aligned with the adapter 1400, a user can grasp the carrier 1350 to push fiber optic connectors 1100 into the opening 1402 of the adapter 1400. The forward facing surface 1368 on the projection 1362 engages the rear surface the housing 1102 and, more particularly, the rear surface of the central portion 1168 of the rail receiving portion 1164. That causes the latch 1172 with an engagement surface 1174 to deflect downward as it enters into the adapter 1400, and once it reaches the window 1404, latch 1172 will return and position itself in the window 1404.

Figure 35:
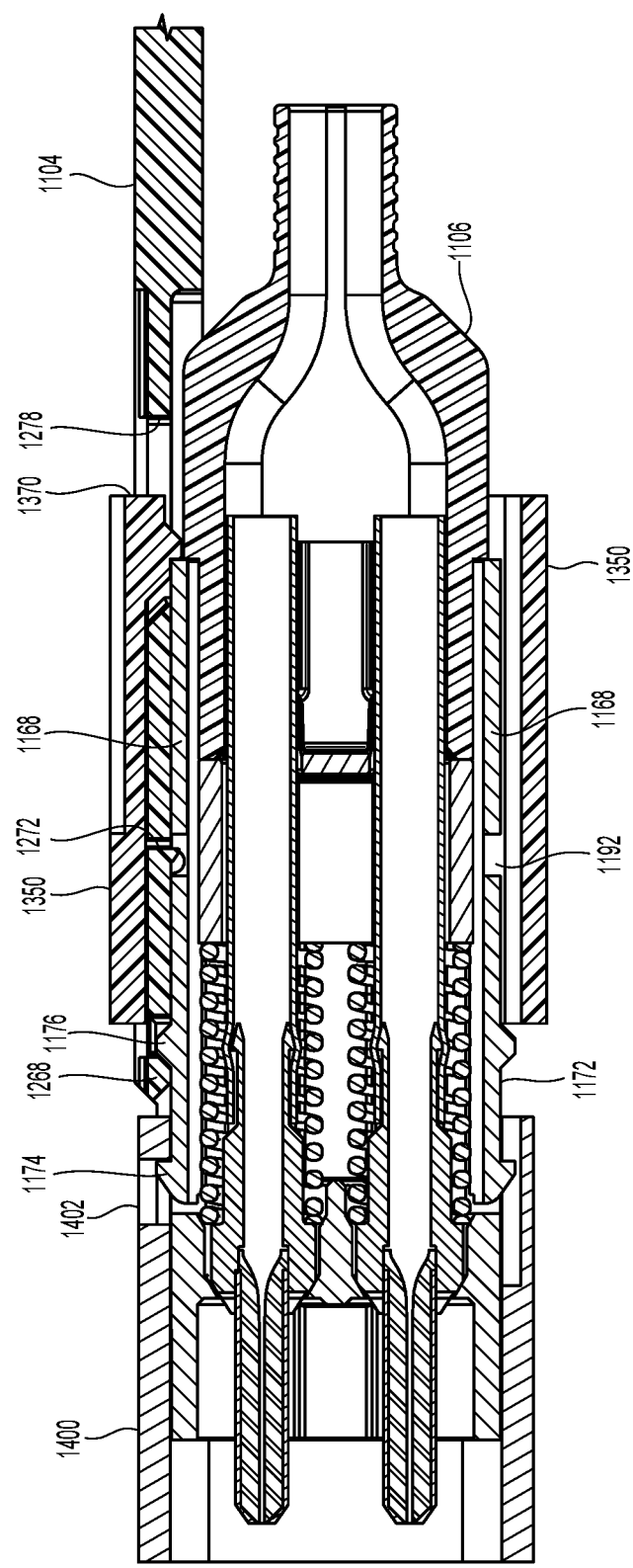
FIG. 35 a cross section view of fiber optic connector with a push-pull mechanism and crimp body in a carrier being removed from the adapter.

The removal of the fiber optic connectors 1100 be explained with reference to FIG. 35. Fiber optic connectors 1100 can be removed from the adapter 1400 by using the carrier 1354 or the latch component (push-pull mechanism) 1104. If the user is going to use the latch component (push-pull mechanism) 1104, the user will pull on the grasping portion 1260. This will cause the chamfered surface 1270 to engage the release ramp 1176. This will cause the latch 1172 to be biased downward freeing the engagement surface 1174 from the adapter window 1402. Further pulling on the latch component (push-pull mechanism) 1104 will pull the fiber optic connector 1100 from the adapter 1400 as the rearward facing surface 1272 engages surface 1194 in the opening 1192.

If the carrier 1350 is to be used, the carrier 1350 is moved rearwardly relative to the latch component (push-pull mechanism) 1104. The rear facing surface 1370 of the carrier 1350 engages the generally flat rear surface 1278 of opening 1274, causing the chamfered surface 1270 to engage the release ramp 1176. This releases all of the fiber optic connectors 1100 from the adapter 1400.

Figure 36:
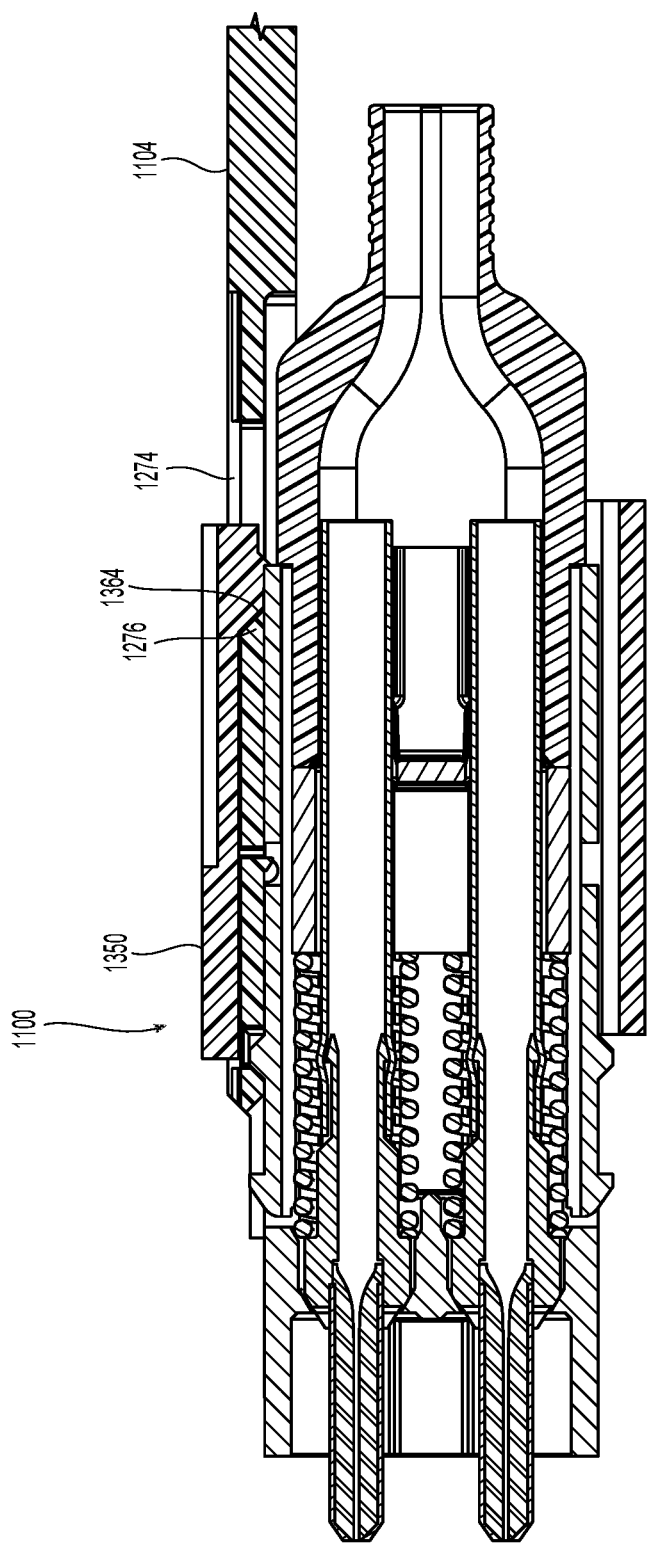
FIG. 36 is a cross section view of fiber optic connector with a push-pull mechanism and crimp body being removed from a carrier.

Finally, with reference to FIG. 36, the fiber optic connector 1100 can be removed from the carrier 1350. While holding the carrier 1350 steady, the user can pull on the latch component (push-pull mechanism) 1104, which causes the chamfered service 1276 in the opening 1274 to engage the first surface 1364 of projection 1362 of the carrier 1350. This will cause the cantilevered latch 1358 to deflect upward and out-of-the-way so that the latch component (push-pull mechanism) 1104 can be removed from the fiber optic connector.

Figure 37:
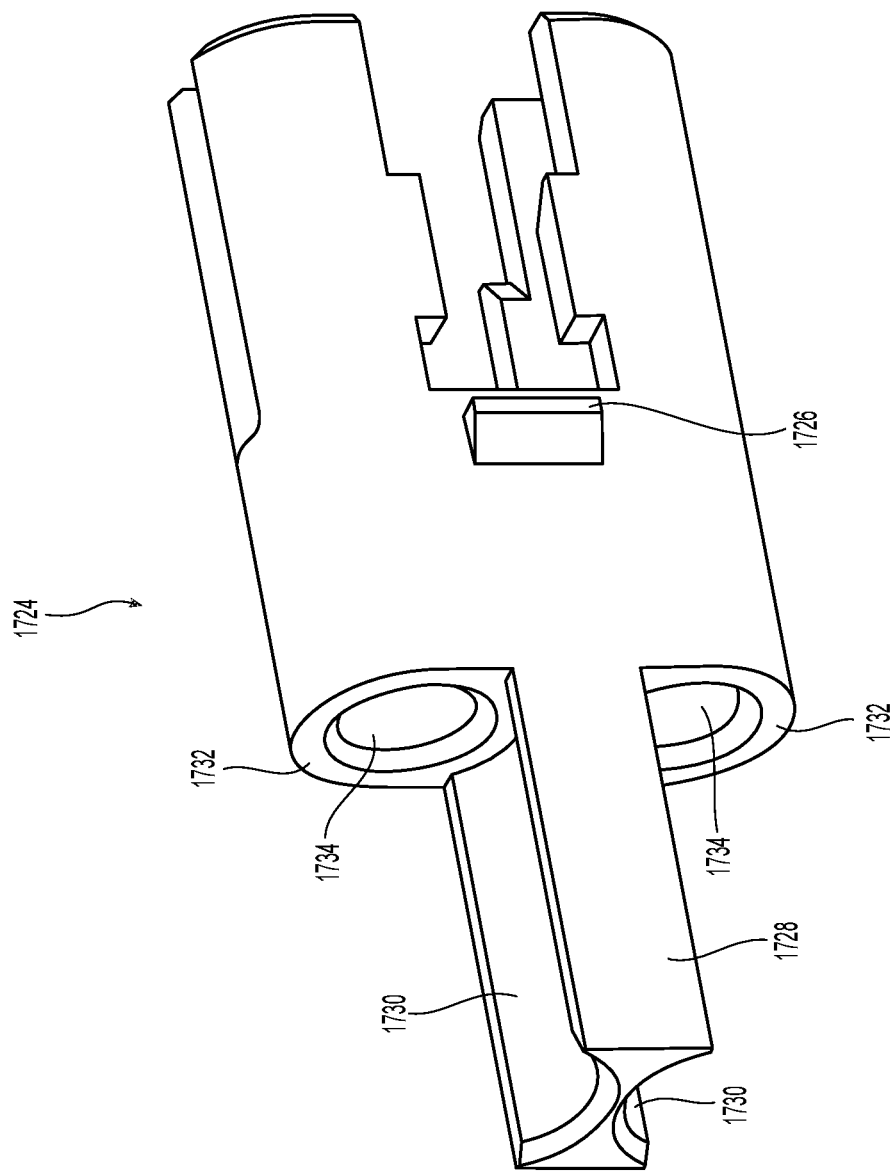
FIG. 37 is a perspective view of a second embodiment of a spring push according to the present invention.

An alternative spring push 1724 is illustrated in FIG. 37. The spring push 1724 has a pair of detents 1726 that frictionally engage an inside surface of the housing. This would eliminate the need for any openings in the housing as there are no latches to be secured. The spring push 1724 includes an extension 1728 with opposing sides 1730 that are semi-circular and provide more support to the springs 122. The extension 1728 terminates at two circular surfaces 1732 that engages the end of the springs 122. There are openings 1734 in the middle of the circular surfaces 1732 to receive lead-in tubes, that extend out the back of the spring push 1724. The back end of the spring push 1724 may also have a different connection system for a crimp band.

Figure 38:
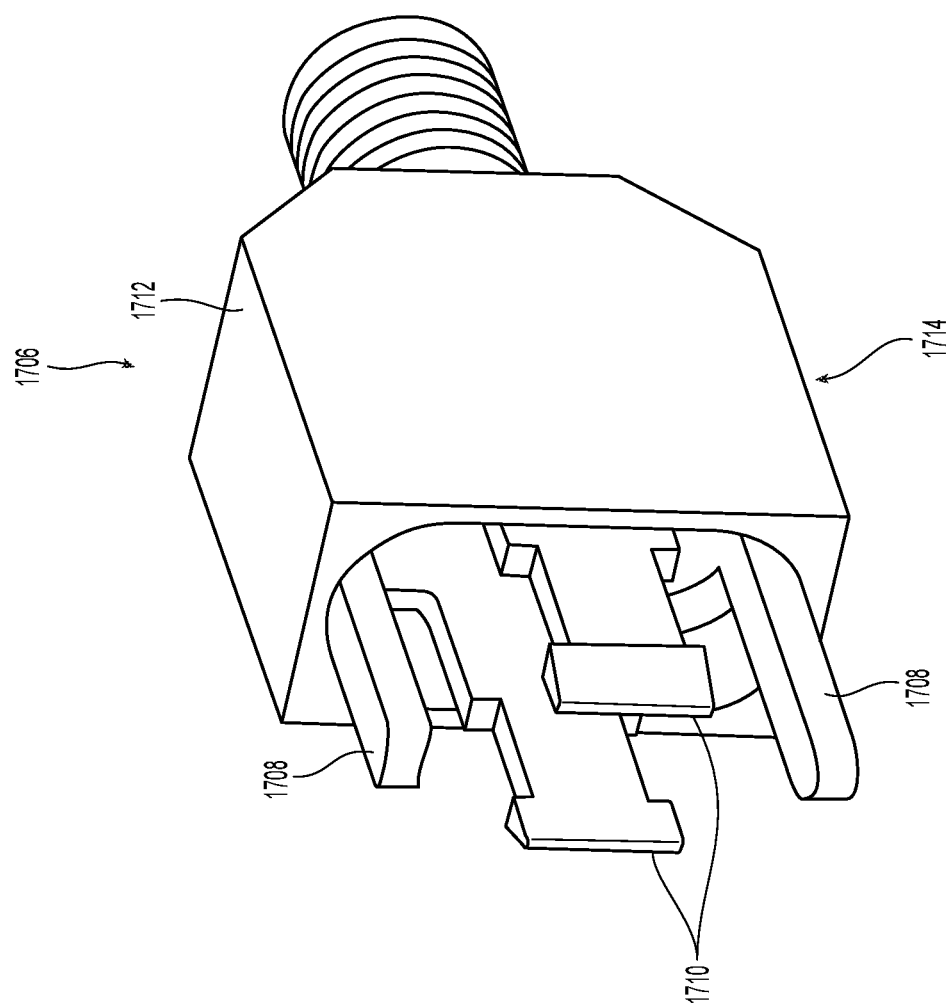
FIG. 38 is a perspective view of a second embodiment of a crimp body according to the present invention.

An alternative crimp band 1706 is illustrated in FIG. 38. The crimp band 1706 has two projections 1708 and two t-shaped extensions 1710 directed toward the front thereof. The crimp band 1706 provides the same function as the crimp bands in the two prior embodiments. While not shown, the top and bottom surfaces 1712 and 1714 may be configured to assist with the alignment of a push-pull mechanism. The crimp band 1706 also provides an internal space that allows for a smooth transition of the optical fibers through the openings 1734 and the lead-in tubes of any associated fiber optic connector.

A third embodiment of a fiber optic connector 2100 according to the present invention is illustrated in FIGS. 39-49. The fiber optic connector 2100 is similar to the other embodiments in that the majority of the parts of the fiber optic connector 2100 are the same, except that the latch component (push-pull mechanism) 2104 is a self-returning latch component (push-pull mechanism) 2104. That is, that if the user pulls rearwardly on the latch component (push-pull mechanism) 2104, then the latch component (push-pull mechanism) 2104 will return to its original position (a forward position) without having to be returned manually. In the prior embodiments, if the latch component (push-pull mechanism) 104, 1104 were to be pulled (to remove the fiber optic connectors from the adapter/carrier, then the latch component (push-pull mechanism) would remain in a rearward position. The present embodiment is biased such that the latch component (push-pull mechanism) 2104 will automatically return to the forward position.

Given the similarities between this embodiment of a fiber optic connector and those discussed above, particularly the first embodiment, only a discussion about the new components will be included. Thus, the discussion will be about the latch component (push-pull mechanism) 2104 and small changes to the housing 2102.

The latch component (push-pull mechanism) 2104 is illustrated in more detail in FIGS. 40-48. The latch component (push-pull mechanism) 2104 has a main body 2210 and a latch body 2212 that attaches to the main body 2210. See FIGS. 40-43. The main body 2210 has a front portion 2214, a middle portion 2216, and a rear portion 2218. Generally, the front portion 2214 is where the latch body 2212 attaches to the main body 2210 and provides for the latching of the fiber optic connector 2100 to an adapter and carrier as discussed above. The middle portion 2216 provides an area for the flexure member 2220 and to engage the latch component (push-pull mechanism) 2104. The rear portion 2218 has a grasping portion 2222 to allow a user to push and pull the latch component (push-pull mechanism) 2104 to engage and disengage the fiber optic connector 2100 from the adapter and/or carrier.

The front portion 2214 is divided into a first front portion 2230 and a second front portion 2232. The first front portion 2230 has two windows 2234 and 2236 and the second front portion 2232 has a window 2238. The second window 2236 of the first front portion 2230 and window 2238 are to receive a latch from the latch body 2212 therethrough. The first window 2234 (and the third window 2238 as well) is to receive a latch pad on the latch body 2212. An underside of the first portion 2214 has a groove 2240 on either side to receive an extended portion of the latch pads 2242,2244 from the latch body 2212 (see FIGS. 43 and 47) to secure the latch body 2212 to the main body 2210. The extended portion of the latch pads 2242,2244 (and thus the latch body 2212) are able to slide within the grooves 2240 to allow for the latching and unlatching the fiber optic connector 2100. The grooves 2240 should extend the length of the first portion 2214.

The second front portion 2232 has an upper surface 2246 that is higher than an upper surface 2248 of the first front portion 2214. This allows for the latching of a carrier and an adapter with the same device, as described above for the other embodiments. On the bottom side 2250 of the second front portion 2232 are two extensions 2252, 2254 that are a complementary configuration of a rail receiving portion of the housing 2102. See FIG. 41. The latch body 2212 also has the same rail portion configuration of two extensions 2256, 2258 on the bottom thereof. This allows the main body 2210 and the latch body 2212 to be slidingly attached to the rail receiving portion of the housing 2102. When the latch body 2212 is inserted into the first front portion 2230, a front surface 2260 of the two extensions 2252, 2254 provides a pushing surface by which the main body 2210 can push the latch body 2212 in the rail receiving portion. See also FIG. 44. The front surface 2262 of the two extensions 2256, 2258 also provides a pushing surface to be used against the stop surface 2264 of the housing 2102. See FIGS. 45 and 48. This allows for the user to exert a force on the latch component (push-pull mechanism) 2104 which is transferred through the main body 2210 to the latch body 2212 and to the housing 2102 to insert the fiber optic connector 2100 into a carrier and/or adapter.

The middle portion 2216 also has a window 2270 to receive a portion of the flexure member 2220, which extends from the latch body 2212. The middle portion 2216 also has on the bottom side 2250 a cavity or space 2272 to receive any other portions of the flexure member 2220 that may be needed.

Figure 42:
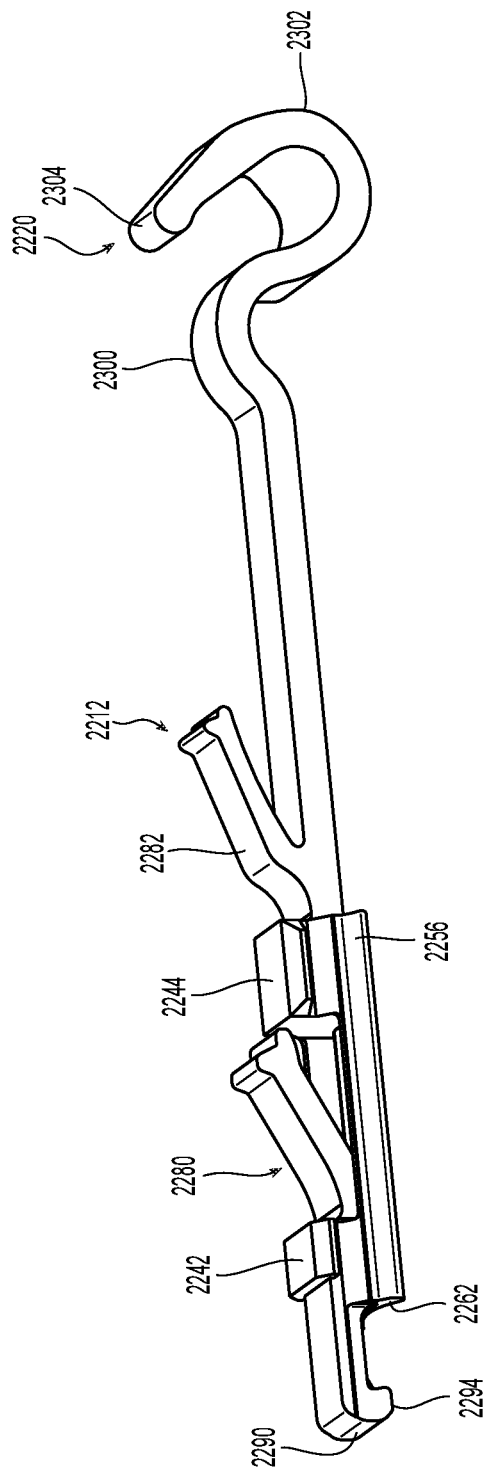
FIG. 42 is a right perspective view of the latch body with a flexure mechanism of FIG. 39.
Figure 43:
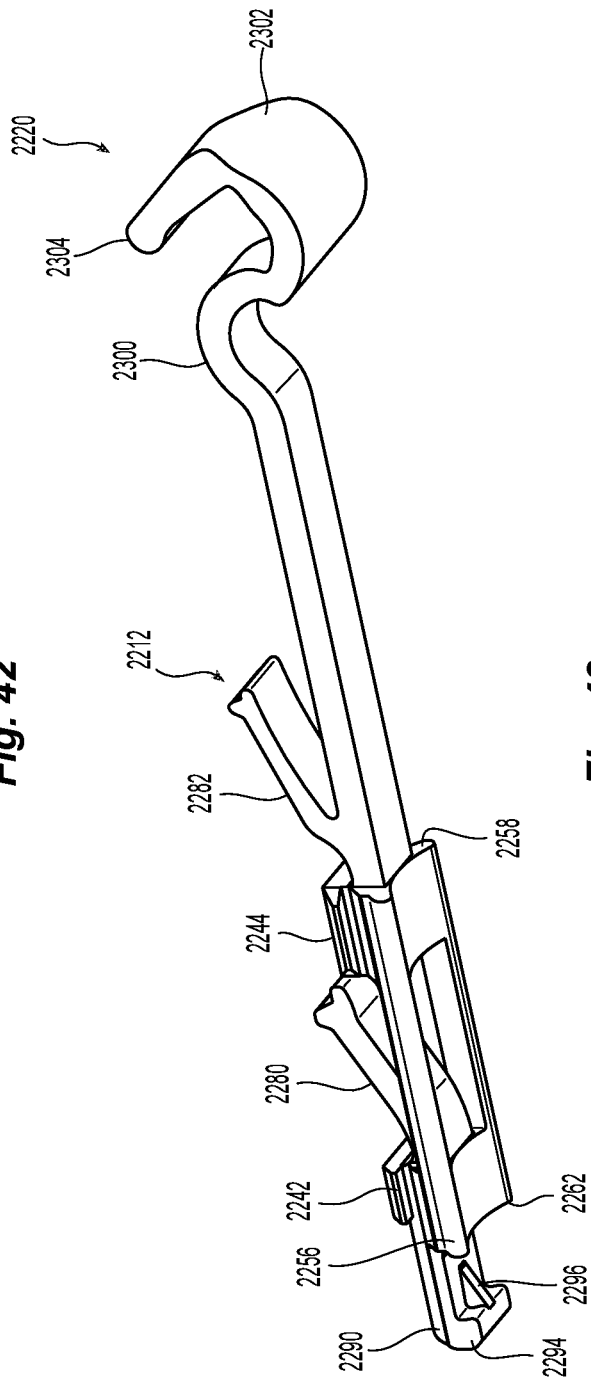
FIG. 43 is a right bottom perspective view of the latch body and flexure mechanism of FIG. 39
Figure 44:
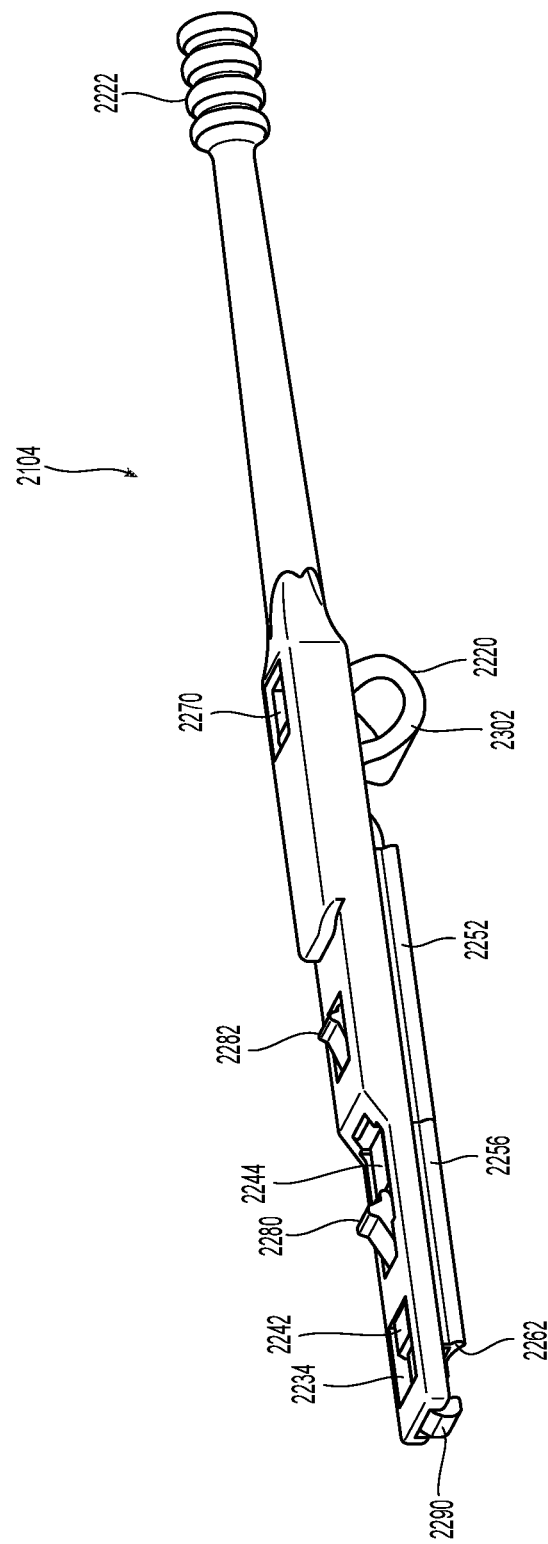
FIG. 44 is a right perspective view of the push-pull mechanism with latch body and flexure mechanism.

Turning to FIGS. 42 and 43, the latch body 2212 has two latches, an adapter latch 2280 and a carrier latch 2282. The latch body 2212 may only have one of the latches, depending upon its uses and the needs of the user. The adapter latch 2280 extends from a forward portion of the latch body 2212 and protrudes through window 2236 of the main body 2210. The carrier latch 2282 also extends from the latch body 2212, from a rear portion thereof, and protrudes through the window 2238 of the main body 2210. As is recognized from FIG. 44, the adapter latch 2280 does not rise as high as the carrier latch 2282 as in the other embodiments as well. The discussion from those embodiments with regard to the position and the composition of the ends of the latches is adopted for this embodiment as well.

The latch body 2212 has a connector latch 2290 as well. The connector latch 2290 extends forward beyond the front surface 2262 of the two extensions 2256, 2258 to engage a latch stop 2292 at the stop surface 2264. The connector latch 2290 has a downward curling portion 2294 that provides a surface to engage the latch stop 2292. The connector latch 2290 may also have a latch rib 2296 that connects the curling portion 2294 to the remainder of the connector latch 2290. The latch stop 2292 may also have a groove 2298 there-in to receive the latch rib 2296. It is the connector latch 2290 that retains the latch body 2212 with the housing 2102. As described below in more detail, when the latch component (push-pull mechanism) 2104 is pulled rearwardly, the connection of the connector latch 2290 with the housing 2102 allows the main body 2210 to move relative to the latch body 2212.

Figure 39:
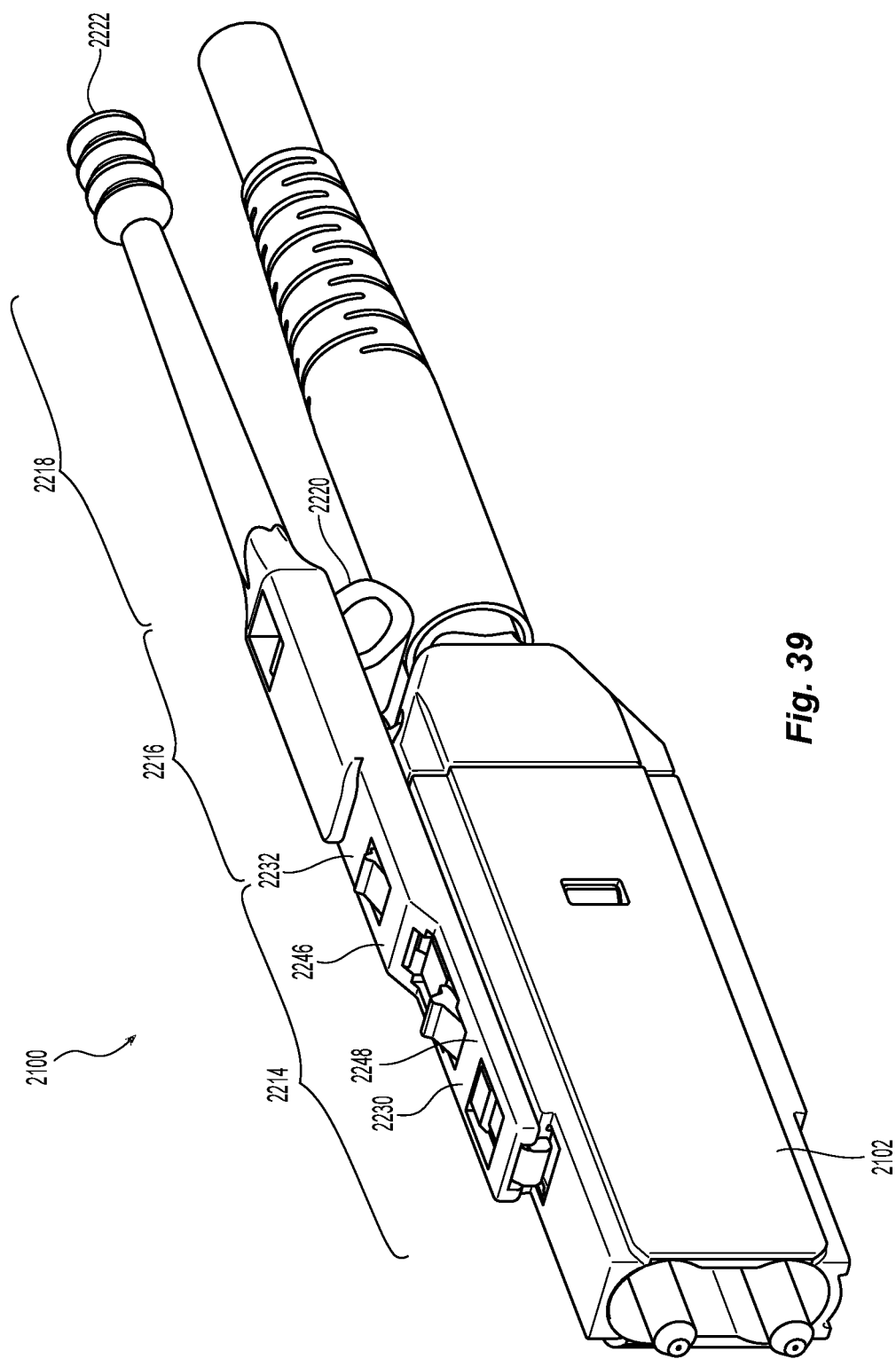
FIG. 39 is an elevational view of another embodiment of a fiber optic connector with a push-pull mechanism, crimp body, and boot according to the present invention.
Figure 40:
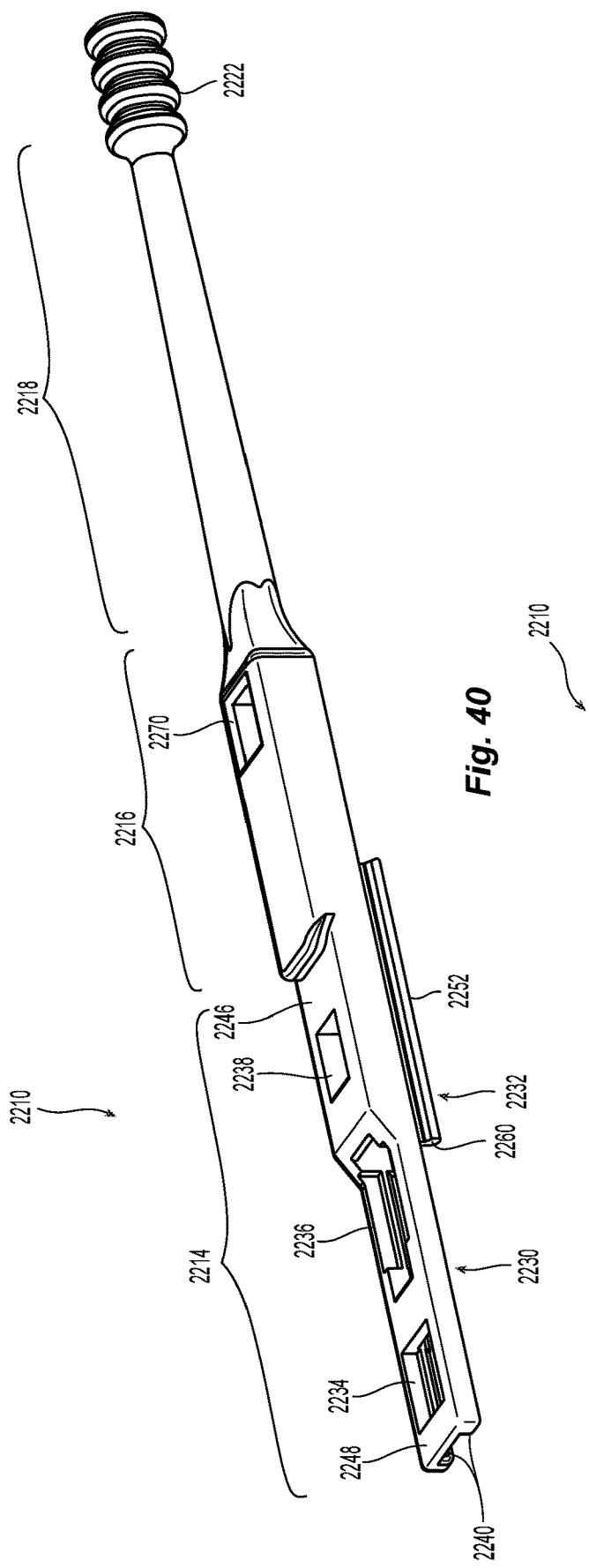
FIG. 40 is a right top perspective view of the push-pull mechanism of FIG. 39.
Figure 41:
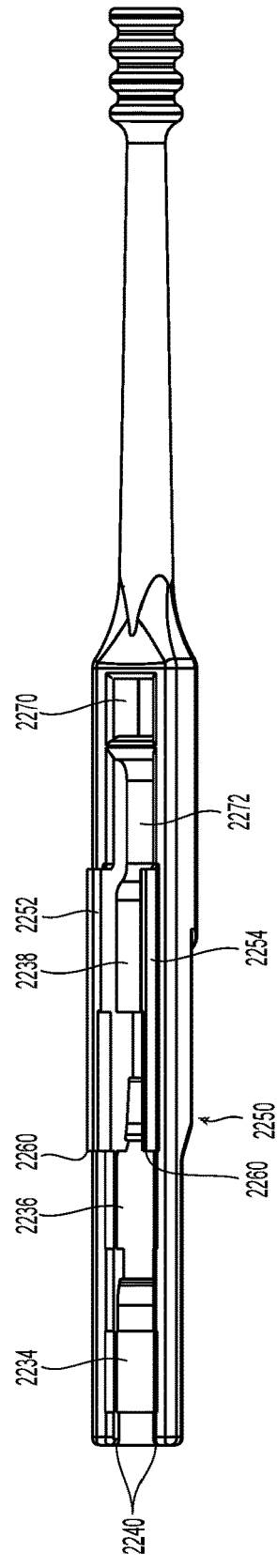
FIG. 41 is a bottom perspective view of the push-pull mechanism of FIG. 39.
Figure 45:
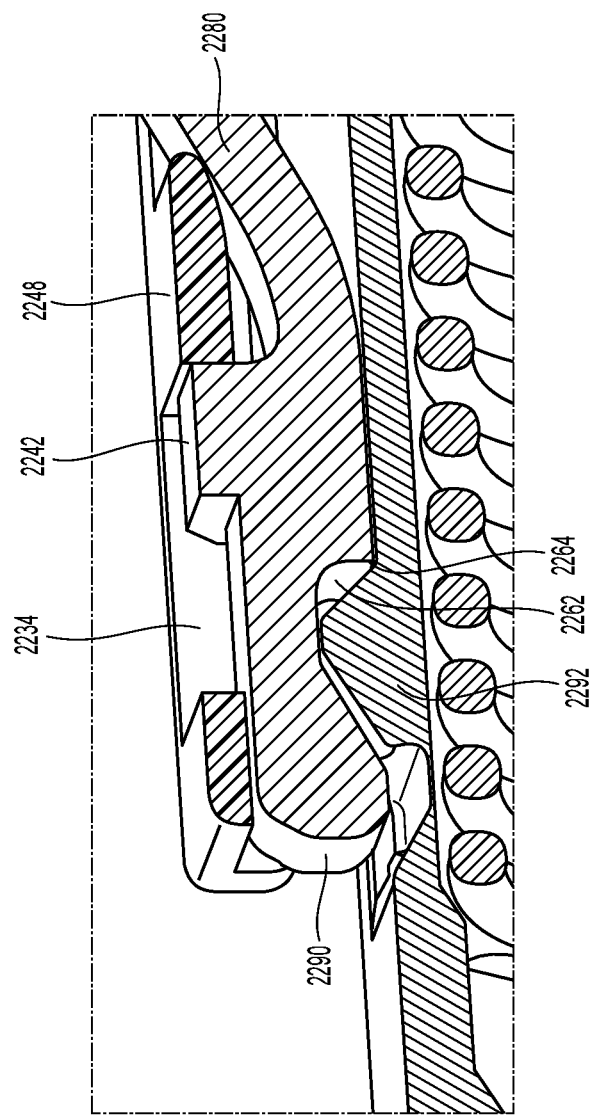
FIG. 45 is an enlarged cross sectional view of a portion of the push-pull mechanism, latch body, and fiber optic connector of FIG. 39.
Figure 48:
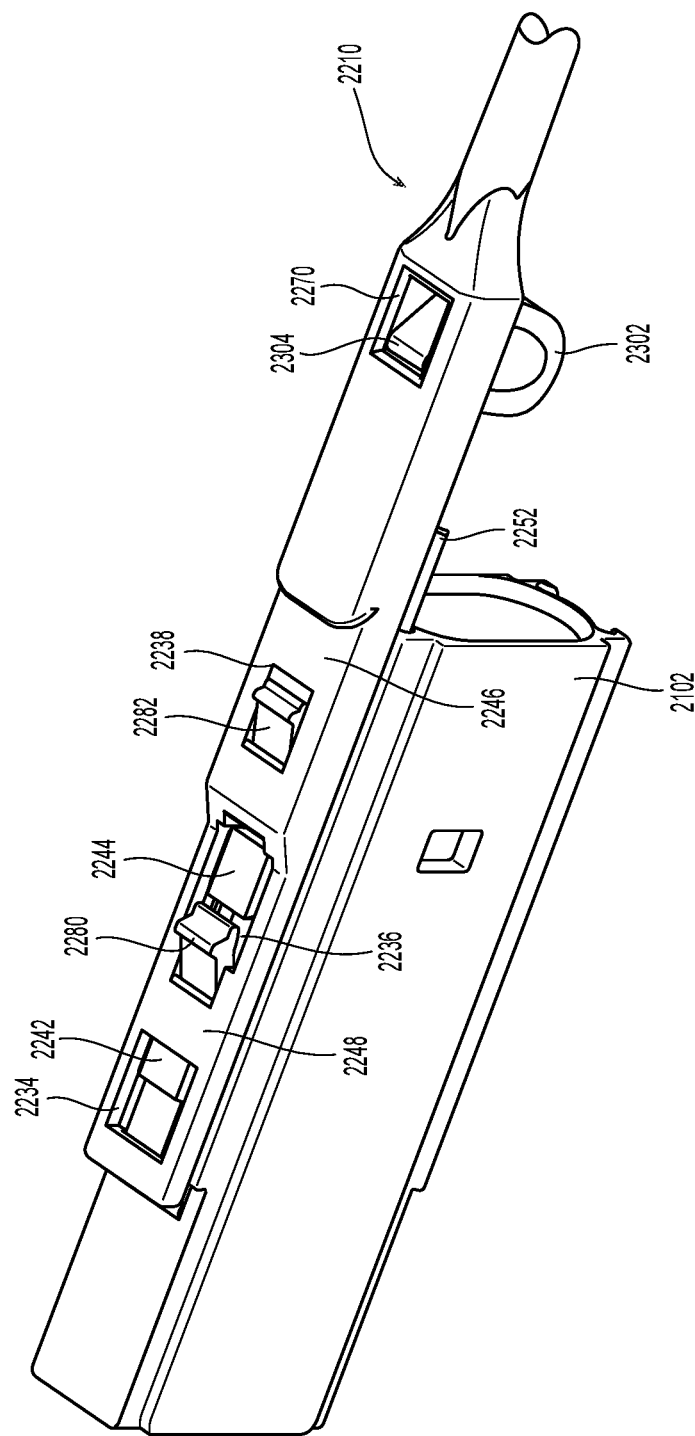
FIG. 48 is a top perspective view of the push-pull mechanism, latch body, and housing.

The latch body 2212 also has two latch pads 2242,2244. The latch pads 2242,2244 have two functions: first to help retain the latch body 2212 in the main body 2210, and second to limit the movement of the latch component (push-pull mechanism) 2104 relative to the housing 2102. As seen in FIGS. 39, 45, and 48, the first latch pad 2242 is disposed within the first window 2234 of the main body 2210. It is evident that as the main body 2210 is pulled relative to the latch body 2212, the first latch pad 2242 will slide relative to the first window 2234 only for certain distance before it engages a portion of the main body 2210. This is true with regard to the second latch pad 2244 as well. Second latch pad 2244 is disposed in the second window 2236 along with the carrier latch 2282. As the main body 2210 is pulled relative to the latch body 2212, the main body 2210 pushes on the adapter latch 2280 (and the carrier latch 2282) in downward out of the window 2236. As the main 2210 body continues in a rearward direction, it will engage the front end of the second pad 2244, prohibiting any further movement of the main body 2210 to the latch body 2212. See FIG. 48.

Figure 46:
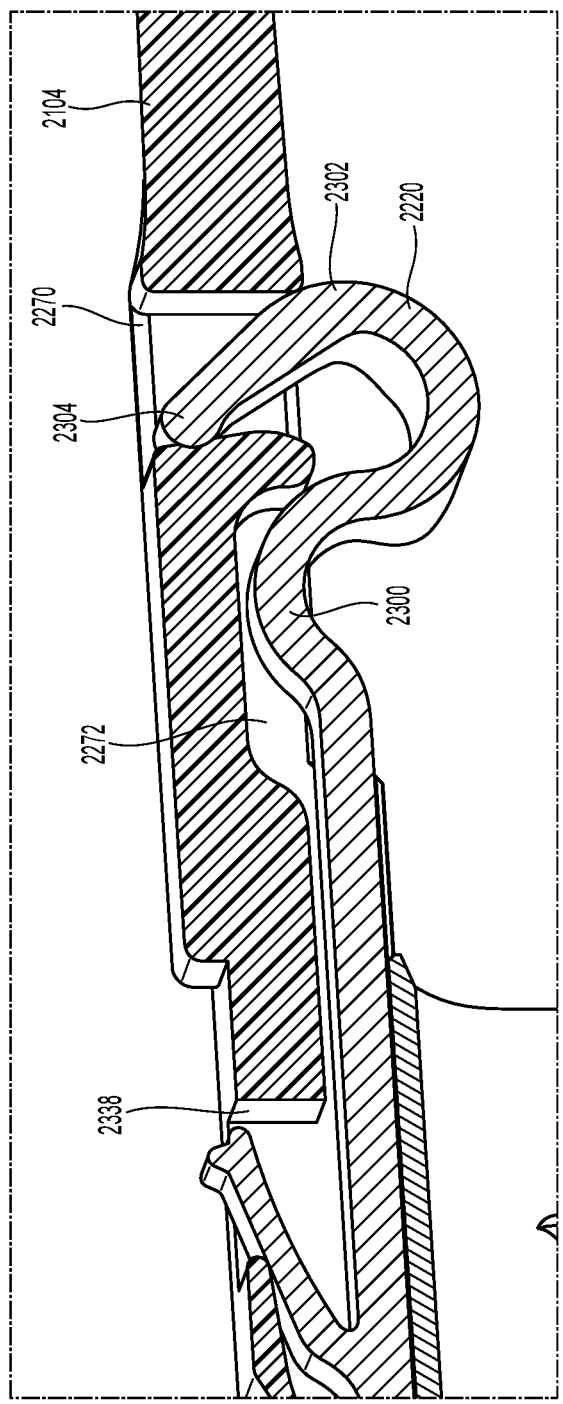
FIG. 46 is enlarged cross sectional view of a portion of the push-pull mechanism, latch body, and fiber optic connector of FIG. 41 at a different location from FIG. 47.
Figure 47:
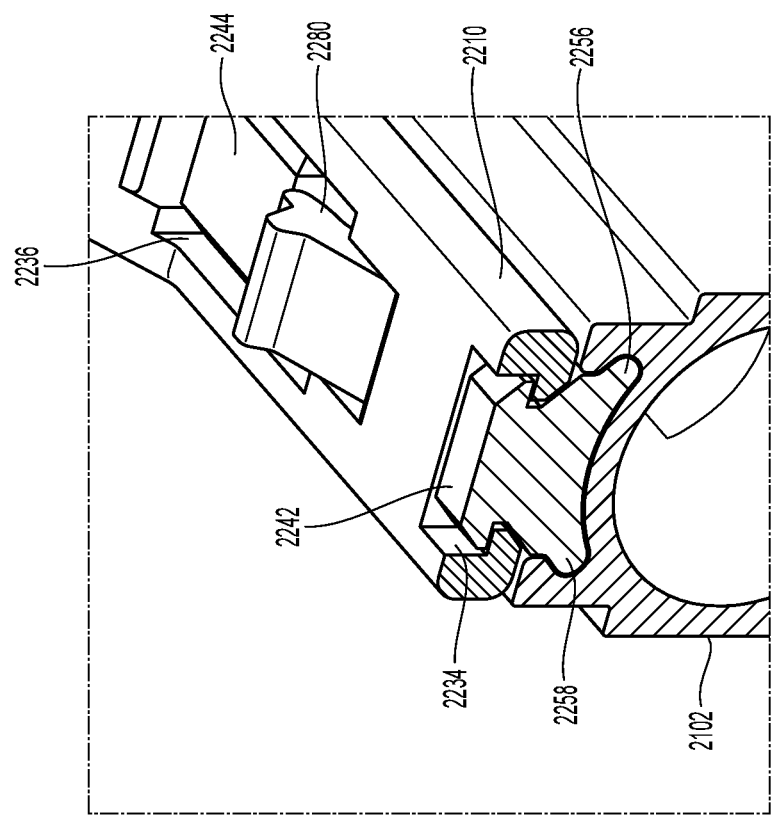
FIG. 47 is a cross sectional view of the push-pull mechanism, latch body, and housing.

Turning to FIGS. 42, 43, 46, the flexure member 2220 will now be described. With particular reference to FIGS. 42 and 43, the flexure member 2220 extends from the rear portion of the latch body 2212. In the embodiment illustrated in the figures, the flexure member 2220 has a first curved portion 2300 and a second curved portion 2302. Second curved portion 2302 terminates at terminal end 2304. The terminal end 2304 is preferably disposed with in the third window 2270 and also preferably makes contact with at least one of the surfaces that define window 2270. See FIG. 46. The first curve portion 2300 also partially resides in the cavity or space 2272. It is also possible that the flexure member 2220 only has one of the two curved portions 2300,2302, depending upon the amount of force required to main body 2210 relative to the latch body 2212.

As the main body 2210 is pulled rearwardly relative to the latch body 2212, the latches 2280, 2282 are moved downward (as also described above) releasing the fiber optic connector 2100 from any adapter and/or carrier. During this movement, the flexure member 2220 is put under tension (the curved portions begin to straighten out or alter from the shape in their state) as the terminal end 2304 presses against the wall of opening 2270. Once the fiber optic connector 2100 is free from the adapter and/or carrier and the user releases the grasping portion 2222, the main body 2210 will return to its original state as the flexure member pulls on the main body 2210. See FIG. 39. The flexure member 2220 acts as a self-return mechanism for the latch component (push-pull mechanism) 2104. Accordingly, there are other self-returning mechanisms that may be used instead of the particular embodiment of the flexure member 2220. For example, a spring could be used to bias the main body 2210 relative to the latch body 2212.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. A push-pull mechanism for use with a fiber optic connector having a housing with a top housing surface and a bottom housing surface comprising:
   - a main body having a front portion, a middle portion and a rear portion;
   - a latch body connected to the front portion of the main body, the front portion having at least one window to receive at least one latch therethrough from the latch body, the at least one latch for engaging a fiber optic connector adapter; and
   - a rail portion extending along side portions of the latch body and main body to slidably engage the fiber optic connector housing on one of the top housing surface and the bottom housing surface.

2. The push-pull mechanism according to claim 1, further comprising a flexure member connected to the latch body to bias the main body toward a front end of the fiber optic connector housing.

3. The push-pull mechanism according to claim 2, wherein the flexure member engages a portion of the fiber optic connector housing in front of the front portion of the main body.

4. The push-pull mechanism according to claim 2, wherein the flexure member also engages the main body at the rear portion.

5. The push-pull mechanism according to claim 2, wherein the flexure member engages the main body in the front portion, the middle portion and the rear portion.

6. The push-pull mechanism according to claim 1, further comprising a grasping portion on the rear portion to allow a user to push and pull the push-pull mechanism to engage and disengage the fiber optic connector from the adapter.

7. The push-pull mechanism according to claim 1, wherein the at least one window comprises two windows and the at least one latch comprises two latches, the second latch extending through the second window and to engage a carrier.

8. The push-pull mechanism according to claim 1, further comprising two housing latches in the middle portion of the main body to engage the fiber optic connector housing.

9. The push-pull mechanism according to claim 1, wherein the location of the rail portion in the fiber optic connector housing thereby determines a polarity of the fiber optic connector.

10. A push-pull mechanism for use with a fiber optic connector having a housing with a top housing surface and a bottom housing surface comprising:
   a main body having a front portion, a middle portion and a rear portion;
   two latches extending outward from the front portion, the first latch for engaging a fiber optic connector adapter and the second latch for engaging a carrier;
   a rail portion extending along side portions of the main body to slidably engage the fiber optic connector housing on one of the top housing surface and a bottom housing surface; and
   a grasping portion on the rear portion to allow a user to push and pull the push-pull mechanism to engage and disengage the fiber optic connector from the carrier and the adapter.

11. The push-pull mechanism according to claim 10, further comprising a latch body connected to the front portion, the latch body having the two latches.

12. The push-pull mechanism according to claim 11, further comprising a flexure member connected to the latch body to bias the main body toward a front end of the fiber optic connector housing.

13. The push-pull mechanism according to claim 12, wherein the flexure member engages a portion of the fiber optic connector housing in front of the front portion of the main body.

14. The push-pull mechanism according to claim 12, wherein the flexure member also engages the main body at the rear portion.

15. The push-pull mechanism according to claim 12, wherein the flexure member engages the main body in the front portion, the middle portion and the rear portion.

16. The push-pull mechanism according to claim 10, further comprising two housing latches in the middle portion of the main body to engage the fiber optic connector housing.

* * * * *